US012762472B2

(12) United States Patent
Cheng et al.

(10) Patent No.: US 12,762,472 B2
(45) Date of Patent: Oct. 13, 2026

(54) MODEL TRAINING METHOD AND APPARATUS FOR FEDERATED LEARNING, DEVICE, AND STORAGE MEDIUM

(71) Applicant: Tencent Technology (Shenzhen) Company Limited, Shenzhen (CN)

(72) Inventors: Yong Cheng, Shenzhen (CN); Yangyu Tao, Shenzhen (CN); Shu Liu, Shenzhen (CN); Jie Jiang, Shenzhen (CN); Yuhong Liu, Shenzhen (CN); Peng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 968 days.

(21) Appl. No.: 17/989,042

(22) Filed: Nov. 17, 2022

(65) Prior Publication Data

US 2023/0078061 A1 Mar. 16, 2023

Related U.S. Application Data

(63) Continuation of application No. PCT/CN2022/082492, filed on Mar. 23, 2022.

(30) Foreign Application Priority Data

Mar. 30, 2021 (CN) ......................... 202110337283.9

(51) Int. Cl.

*G06N 20/00* (2019.01)
*G06F 7/32* (2006.01)

(Continued)

(52) U.S. Cl.

CPC ............... *G06N 20/00* (2019.01); *G06F 7/32* (2013.01); *G06F 7/49947* (2013.01); *G06F 9/54* (2013.01); *G06N 3/045* (2023.01); *G06N 3/084* (2013.01)

(58) Field of Classification Search

CPC .......... G06F 7/32; G06F 7/49947; G06F 9/54; G06N 20/00; G06N 3/045; G06N 3/084

See application file for complete search history.

(56) References Cited

U.S. PATENT DOCUMENTS

| | | | | |
|---|---|---|---|---|
| 2013/0198372 A1* | 8/2013 | Wei | ....................... | H04L 41/142 709/224 |
| 2020/0311520 A1 | 10/2020 | Zhao et al. | | |

(Continued)

FOREIGN PATENT DOCUMENTS

| | | |
|---|---|---|
| CN | 109165725 A | 1/2019 |
| CN | 110276210 A | 9/2019 |

(Continued)

OTHER PUBLICATIONS

Kai Yang; A Quasi-Newton Method Based Vertical Federated Learning Framework for Logistic Regression; arXiv (Year: 2019).*

(Continued)

*Primary Examiner* — Abdullah Al Kawsar

(74) *Attorney, Agent, or Firm* — Crowell & Moring LLP

(57) ABSTRACT

A model training method and apparatus for federated learning, a device and a storage medium are provided, which belong to the technical field of machining learning. The method includes: generating an $i^{th}$ scalar operator based on a $(t-1)^{th}$ round of training data and a $t^{th}$ round of training data (201); transmitting an $i^{th}$ fusion operator to a next node device based on the $i^{th}$ scalar operator (202); determining an $i^{th}$ second-order gradient descent direction of an $i^{th}$ sub-model based on an acquired second-order gradient scalar, an $i^{th}$ model parameter and an $i^{th}$ first-order gradient; and updating the $i^{th}$ sub-model based on the $i^{th}$ second-order gradient descent direction to obtain a model parameter of the $i^{th}$ sub-model during a $(t+1)^{th}$ round of iterative training.

10 Claims, 8 Drawing Sheets

(51) Int. Cl.

| | |
|---|---|
| ***G06F 7/499*** | (2006.01) |
| ***G06F 9/54*** | (2006.01) |
| ***G06N 3/045*** | (2023.01) |
| ***G06N 3/084*** | (2023.01) |

(56) References Cited

U.S. PATENT DOCUMENTS

| | | | | |
|---|---|---|---|---|
| 2021/0067339 | A1* | 3/2021 | Schiatti | G06N 20/00 |
| 2021/0073639 | A1* | 3/2021 | Jakkam Reddi | G06N 20/20 |
| 2021/0383197 | A1* | 12/2021 | Da Silva | G06N 3/047 |
| 2022/0004933 | A1* | 1/2022 | Gu | G06N 20/10 |
| 2022/0101054 | A1* | 3/2022 | Abouzeid | G06N 3/0499 |
| 2022/0114475 | A1* | 4/2022 | Zhu | G16H 50/20 |
| 2022/0237508 | A1* | 7/2022 | Shaloudegi | G06N 3/098 |
| 2022/0374542 | A1* | 11/2022 | Ghazi | G06F 21/6254 |

FOREIGN PATENT DOCUMENTS

| | | | |
|---|---|---|---|
| CN | 110443067 | A | 11/2019 |
| CN | 111062044 | A | 4/2020 |
| CN | 111091199 | A | 5/2020 |
| CN | 111212110 | A | 5/2020 |
| CN | 111222628 | A | 6/2020 |
| CN | 111310932 | A | 6/2020 |
| CN | 111539731 | A | 8/2020 |
| CN | 111553483 | A | 8/2020 |
| CN | 111553486 | A | 8/2020 |
| CN | 112132292 | A | 12/2020 |
| CN | 112149174 | A | 12/2020 |
| CN | 112217706 | A | 1/2021 |
| CN | 112733967 | A | 4/2021 |
| WO | WO 2020/029585 | A1 | 2/2020 |
| WO | WO 2020/248537 | A1 | 12/2020 |
| WO | WO 2021/114929 | A1 | 6/2021 |
| WO | WO 2022/116725 | A1 | 6/2022 |
| WO | WO 2022/206510 | A1 | 10/2022 |

OTHER PUBLICATIONS

Qianjun Wei; Privacy-preserving two-parties logistic regression on vertically partitioned data using asynchronous gradient sharing; Springer Science+Business Media, LLC, part of Springer Nature 2020 (Year: 2020).*

Yuncheng Wu, Shaofeng Cai, Xiaokui Xiao, Gang Chen‡, Beng Chin Ooi; Privacy Preserving Vertical Federated Learning for Treebased Models; arxiv (Year: 2020).*

Search Report and Office Action for corresponding application No. CN 202110337283.9 dated May 13, 2021, 13p, in Chinese language.

Concise Explanation of Relevance and Written Opinion.

International Search Report and Written Opinion for priority application No. PCT/CN2022/082492 dated May 19, 2022, 10p, in Chinese language.

English language translation of the International Search Report for priority application No. PCT/CN2022/082492 dated May 19, 2022, 2p.

* cited by examiner

MODEL TRAINING METHOD AND APPARATUS FOR FEDERATED LEARNING, DEVICE, AND STORAGE MEDIUM

RELATED APPLICATION

This application is a continuation of International Patent Application No. PCT/CN2022/082492, filed on Mar. 23, 2022, which claims priority to Chinese Patent Application No. 202110337283.9, entitled "Model Training Method and Apparatus for Federated Learning, Device and Storage Medium", and filed on Mar. 30, 2021. Both of the applications are incorporated herein by reference in their entireties.

TECHNICAL FIELD

Embodiments of this disclosure relate to the technical field of machine learning, and particularly, relate to a model training method and apparatus for federated learning, a device and a storage medium.

BACKGROUND

Federated machine learning is a machine learning framework, and can combine data sources from multiple participants to train a machine learning model while keeping data in the domain, thus improving the performance of the model with the multiple data sources while satisfying the requirements of privacy protection and data security.

In the related art, the model training phase of federated learning requires a trusted third party to act as a central coordination node to transmit an initial model to each participant and collect models trained by all the participants using local data, so as to coordinate the models from all the participants for aggregation, and then transmit the aggregated model to each participant for iterative training.

However, the reliance on a third party for model training allows the third party to acquire model parameters of all other participants, which still has the problem of private data leakage, the security of model training is low and it is very difficult to find a trusted third party, so that the solution is difficult to implement.

SUMMARY

Embodiments of this disclosure provide a model training method and apparatus for federated learning, a device and a storage medium, which can enhance the security of federated learning and facilitate implementation of practical applications. The technical solutions are as follows.

On one hand, this disclosure provides a model training method for federated learning, the method is performed by an $i^{th}$ node device in a vertical federated learning system including n node devices, n is an integer greater than or equal to 2, i is a positive integer less than or equal to n, and the method includes the following steps:

generating an $i^{th}$ scalar operator based on a $(t-1)^{th}$ round of training data and a $t^{th}$ round of training data, the $(t-1)^{th}$ round of training data comprising an $i^{th}$ model parameter and an $i^{th}$ first-order gradient of an $i^{th}$ sub-model after the $(t-1)^{th}$ round of training, the $t^{th}$ round of training data comprising the $i^{th}$ model parameter and the $i^{th}$ first-order gradient of the $i^{th}$ sub-model after the $t^{th}$ round of training, the $i^{th}$ scalar operator being configured to determine a second-order gradient scalar, the second-order gradient scalar being configured to determine a second-order gradient descent direction in an iterative model training process, and t being an integer greater than 1;

transmitting an $i^{th}$ fusion operator to a next node device based on the $i^{th}$ scalar operator, the $i^{th}$ fusion operator being obtained by fusing scalar operators from a first scalar operator to the $i^{th}$ scalar operator;

determining an $i^{th}$ second-order gradient descent direction of the $i^{th}$ sub-model based on the second-order gradient scalar, the $i^{th}$ model parameter, and the $i^{th}$ first-order gradient, the second-order gradient scalar being determined and obtained by a first node device based on an $n^{th}$ fusion operator; and updating the $i^{th}$ sub-model based on the $i^{th}$ second-order gradient descent direction to obtain model parameters of the $i^{th}$ sub-model during a $(t+1)^{th}$ round of iterative training.

On the other hand, this disclosure provides a model training apparatus for federated training, and the apparatus includes a structure as follows:

generating module, configured to generate an $i^{th}$ scalar operator based on a $(t-1)^{th}$ round of training data and a $t^{th}$ round of training data, the $(t-1)^{th}$ round of training data including an $i^{th}$ model parameter and an $i^{th}$ first-order gradient of an $i^{th}$ sub-model after the $(t-1)^{th}$ round of training, the $t^{th}$ round of training data including the $i^{th}$ model parameter and the $i^{th}$ first-order gradient of the $i^{th}$ sub-model after the $t^{th}$ round of training, the $i^{th}$ scalar operator being used for determining a second-order gradient scalar, the second-order gradient scalar being used for determining a second-order gradient descent direction in an iterative model training process, and t being an integer greater than 1;

a transmitting module, configured to transmit an $i^{th}$ fusion operator to a next node device based on the $i^{th}$ scalar operator, the $i^{th}$ fusion operator being obtained by fusing scalar operators from a first scalar operator to the $i^{th}$ scalar operator;

a determining module, configured to determine an $i^{th}$ second-order gradient descent direction of the $i^{th}$ sub-model based on the acquired second-order gradient scalar, the $i^{th}$ model parameter and the $i^{th}$ first-order gradient, the second-order gradient scalar being determined and obtained by a first node device based on an $n^{th}$ fusion operator; and a training module, configured to update the $i^{th}$ sub-model based on the $i^{th}$ second-order gradient descent direction to obtain model parameters of the $i^{th}$ sub-model during a $(t+1)^{th}$ round of iterative training.

According to another aspect, an embodiment of this disclosure provides a computer device, including a memory, configured to store at least one program; and at least one processor, electrically coupled to the memory and configured to execute the at least one program to perform steps comprising:

generating, by an $i^{th}$ node device in a vertical federated learning system having n node devices, an $i^{th}$ scalar operator based on a $(t-1)^{th}$ round of training data and a $t^{th}$ round of training data, the $(t-1)^{th}$ round of training data comprising an $i^{th}$ model parameter and an $i^{th}$ first-order gradient of an $i^{th}$ sub-model after the $(t-1)^{th}$ round of training, the $t^{th}$ round of training data comprising the $i^{th}$ model parameter and the $i^{th}$ first-order gradient of the $i^{th}$ sub-model after the $t^{th}$ round of training, the $i^{th}$ scalar operator being configured to determine a second-order gradient scalar, the second-order gradient scalar being configured to determine a second-order gradient descent direction in an iterative model training process, t being an integer greater than 1, n being an integer greater than or equal to 2, and i being a positive integer less than or equal to n;

transmitting an $i^{th}$ fusion operator to a next node device based on the $i^{th}$ scalar operator, the $i^{th}$ fusion operator being obtained by fusing scalar operators from a first scalar operator to the $i^{th}$ scalar operator;

determining an $i^{th}$ second-order gradient descent direction of the $i^{th}$ sub-model based on the second-order gradient scalar, the $i^{th}$ model parameter, and the $i^{th}$ first-order gradient, the second-order gradient scalar being determined and obtained by a first node device based on an $n^{th}$ fusion operator; and updating the $i^{th}$ sub-model based on the $i^{th}$ second-order gradient descent direction to obtain model parameters of the $i^{th}$ sub-model during a $(t+1)^{th}$ round of iterative training.

According to another aspect, this disclosure provides a non-transitory computer-readable storage medium, storing at least one computer program, the computer program being configured to be loaded and executed by a processor to perform steps, including:

generating, by an $i^{th}$ node device in a vertical federated learning system having n node devices, an $i^{th}$ scalar operator based on a $(t-1)^{th}$ round of training data and a $t^{th}$ round of training data, the $(t-1)^{th}$ round of training data comprising an $i^{th}$ model parameter and an $i^{th}$ first-order gradient of an $i^{th}$ sub-model after the $(t-1)^{th}$ round of training, the $t^{th}$ round of training data comprising the $i^{th}$ model parameter and the $i^{th}$ first-order gradient of the $i^{th}$ sub-model after the $t^{th}$ round of training, the $i^{th}$ scalar operator being configured to determine a second-order gradient scalar, the second-order gradient scalar being configured to determine a second-order gradient descent direction in an iterative model training process, t being an integer greater than 1, n being an integer greater than or equal to 2, and i being a positive integer less than or equal to n;

transmitting an $i^{th}$ fusion operator to a next node device based on the $i^{th}$ scalar operator, the $i^{th}$ fusion operator being obtained by fusing scalar operators from a first scalar operator to the $i^{th}$ scalar operator;

determining an $i^{th}$ second-order gradient descent direction of the $i^{th}$ sub-model based on the second-order gradient scalar, the $i^{th}$ model parameter, and the $i^{th}$ first-order gradient, the second-order gradient scalar being determined and obtained by a first node device based on an $n^{th}$ fusion operator; and updating the $i^{th}$ sub-model based on the $i^{th}$ second-order gradient descent direction to obtain model parameters of the $i^{th}$ sub-model during a $(t+1)^{th}$ round of iterative training.

An aspect of the embodiments of this disclosure provides a computer program product or a computer program, the computer program product or the computer program including computer instructions, the computer instructions being stored in a computer-readable storage medium. A processor of a computer device reads the computer instructions from the computer-readable storage medium, and the processor executes the computer instructions, so that the computer device performs the model training method for federated learning provided in the various optional implementations in the foregoing aspects.

The technical solutions provided in the embodiments of this disclosure include the following beneficial effects at least:

In embodiments of this disclosure, the second-order gradient descent direction of each sub-model is jointly calculated by transferring fusion operators among n node devices in the federated learning system to complete iterative model training, and a second-order gradient descent method can be used for training a machine learning model without relying on a third-party node; compared with a method using a trusted third party to perform model training in the related art, the problem of high single-point centralized security risk caused by single-point storage of a private key can be avoided, the security of federated learning is enhanced, and implementation of practical applications is facilitated.

DETAILED DESCRIPTION

First, terms involved in the embodiments of this disclosure are introduced as follows:

1) Artificial Intelligence (AI): AI is a theory, method, technology and application system that uses digital computers or machines controlled by digital computers to simulate, extend and expand human intelligence, perceive the environment, acquire knowledge, and use knowledge to obtain the best results. In other words, AI is a comprehensive technology in computer science. This technology attempts to understand the essence of intelligence and produce a new intelligent machine that can react in a manner similar to human intelligence. AI is to study design principles and implementation methods of various intelligent machines, so that the machines have the functions of perception, reasoning, and decision-making. AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. An AI software technology mainly includes fields such as a CV technology, a speech processing technology, a natural language processing technology, and machine learning/deep learning (DL).

2) Machine Learning (ML): ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

3) Federated Learning: Data sources from multiple participants are combined to train a machine learning model and provide model inference services while keeping data in the domain. Federated learning protects user's privacy and data security while making full use of the data sources of the multiple participants to improve the performance of the machine learning model. Federated learning makes cross-sector, cross-company, and even cross-industry data collaboration become possible while meeting the requirements of data protection laws and regulations. Federated learning can be divided into three categories: horizontal federated learning, vertical federated learning and federated transfer learning.

Figure 1:
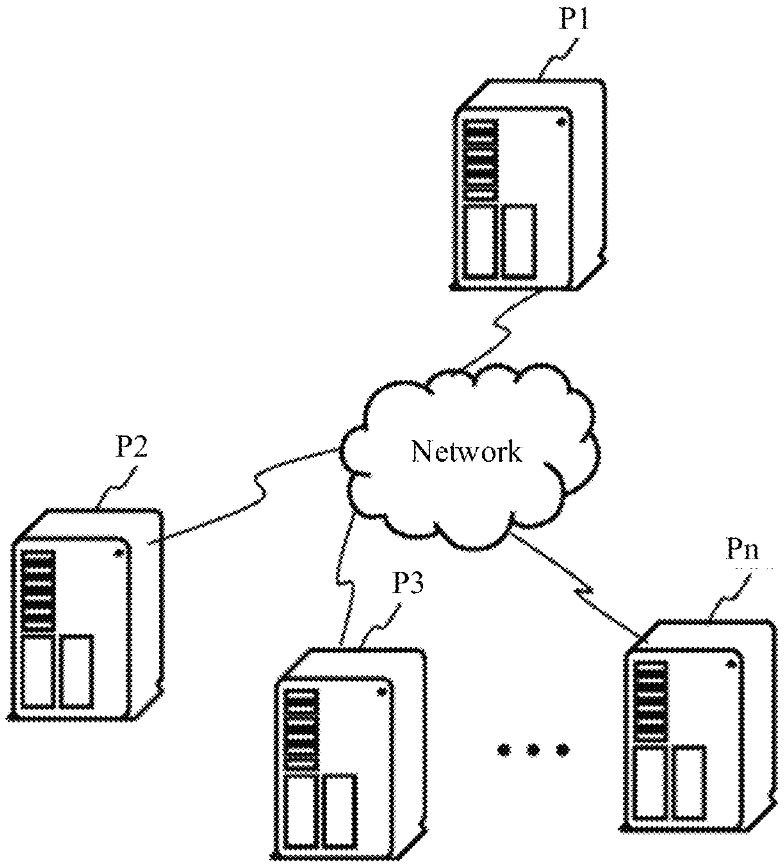
FIG. 1 is a schematic diagram of an implementation environment of a federated learning system provided by an exemplary embodiment of this disclosure.

4) Vertical Federated Learning: It is used for federated learning when there is more overlap of identity document (ID) of training samples of the participants and less overlap of data features. For example, banks and E-commerce companies in the same region have different characteristic data of the same customer A. For example, the bank has financial data of the customer A and the E-commerce company has the shopping data of the customer A. The word "vertical" comes from "vertical partitioning" of data. As shown in FIG. 1, different characteristic data of user samples having an intersection in the multiple participants are combined for federated learning, i.e., the training sample of each participant is vertically partitioned.

An exemplary description is made below for application scenarios of the model training method for federated learning according to an embodiment of this disclosure.

1. This method can ensure that training data is not out of in the domain and no additional third party is required to participate in training, so it can be applied to model training and data prediction in the financial field to reduce risks. For example, the bank, the E-commerce company and a payment platform respectively have different data of the same batch of customers, where the bank has asset data of the customer, the E-commerce company has historical shopping data of the customer, and the payment platform has bills of the customer. In this scenario, the bank, the E-commerce company and the payment platform build local sub-models respectively, and use their own data to train the sub-models. By transferring fusion operators, the bank, the E-commerce company and the payment platform jointly calculate a second-order gradient descent direction and perform iterative updating on the model when model data and user data of other parties cannot be known. A model obtained by combined training can predict goods that fit the user's preferences based on the asset data, the bills and the shopping data, or recommend investment products that match the user, etc. In the practical application process, the bank, the E-commerce company and the payment platform can still use the complete model for combined calculation and predict and analyze the user's behavior while keeping data in the domain.

2. At present, people's network activities are more and more abundant, involving all aspects of life. The method can be applied to an advertisement pushing scenario, for example, a certain social platform cooperates with a certain advertisement company to jointly train a personalized recommendation model, where the social platform has user's social relationship data and the advertisement company has user's shopping behavior data. By transferring the fusion operator, the social platform and the advertisement company train the model and provide a more accurate advertisement pushing service without knowing the model data and user data of each other.

In the related art, the model training phase of federated learning requires a trusted third party to act as a central coordinating node. With the help of the trusted third party, a second-order gradient descent direction and a learning rate are calculated, and then with the help of the trusted third party, multiple parties jointly use a second-order gradient descent method to train the machine learning model. However, in practical application scenarios, it is often difficult to find a trusted third party for storing the private key, rendering that the solutions of the related art are unsuitable for implementation of practical applications. Moreover, when one central node stores the private key, the problems of a single-point centralized security risk and reduction of the security of model training can also be caused.

This disclosure provides a model training method for federated learning, without the necessity to rely on a trusted third party, multiple participants may jointly calculate the second-order gradient descent direction and the learning rate for iterative updating of the model and train the machine learning model, and there is no single-point centralized security risk. In addition, the method based on secret sharing achieves secure computation and can avoid the problem of significant computational overhead and cipher-text expansion.

FIG. 1 shows a block diagram of a vertical federated learning system provided by an embodiment of this disclosure. The vertical federated learning system includes n node devices (also referred to as participants), namely a node device P1, a node device P2 . . . and a node device Pn. Any node device may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. And any two node devices have different data sources, such as data sources of different companies, or data sources of different departments of the same company. Different node devices are responsible for iteratively training different components (i.e. sub-models) of a federated learning model.

The different node devices are connected via a wireless network or a wired network.

In the n node devices, at least one node device has a sample label corresponding to training data; in a process of each round of iterative training, a node device with the sample label plays a dominating role, other n−1 node devices are used in combination to calculate a first-order gradient of each sub-model, and then current model parameters and the first-order gradient are used for enabling a first node device to obtain an $n^{th}$ fusion operator where n scalar operators are fused in a manner of transferring the fusion operator, so as to use the $n^{th}$ fusion operator to calculate a second-order gradient scalar, and the second-order gradient scalar is transmitted to the other n−1 node devices, so that each node device performs model training based on the received second-order gradient scalar until a model converges.

In one exemplarily implementation, the plurality of node devices in the above federated learning system may form a block chain, and the node devices are nodes on the block chain, and data involved in the model training process may be stored on the block chain.

Figure 2:
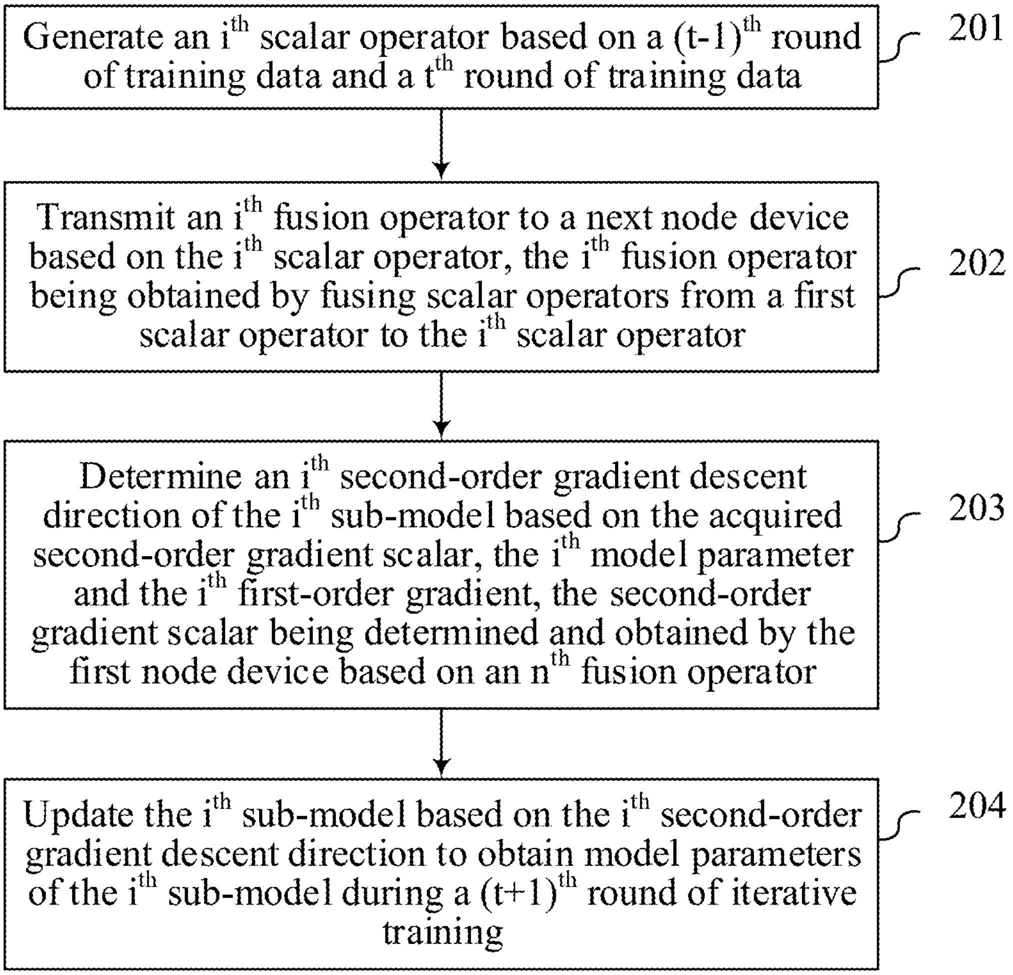
FIG. 2 is a flowchart of a model training method for federated learning provided by an exemplary embodiment of this disclosure.

FIG. 2 shows a flowchart of a model training method for federated training provided by an exemplary embodiment of this disclosure. This embodiment takes that the method is performed by an $i^{th}$ node device in a federated learning system as an example for illustration. The federated learning system includes n node devices, n is an integer greater than 2, i is a positive integer less than or equal to n, and the method includes the following steps.

Step 201: Generate an $i^{th}$ scalar operator based on a $(t-1)^{th}$ round of training data and a $t^{th}$ round of training data.

The $(t-1)^{th}$ round of training data includes an $i^{th}$ model parameter and an $i^{th}$ first-order gradient of an $i^{th}$ sub-model after the $(t-1)^{th}$ round of training; the $t^{th}$ round of training data includes the $i^{th}$ model parameter and the $i^{th}$ first-order gradient of the $i^{th}$ sub-model after the $t^{th}$ round of training, the $i^{th}$ scalar operator is used for determining a second-order gradient scalar; the second-order gradient scalar is used for determining a second-order gradient descent direction in an iterative training process of the model, and t is an integer greater than 1. The $i^{th}$ sub-model refers to a sub-model that an $i^{th}$ node device is responsible for training.

In the federated learning system, different node devices are responsible for performing iterative training on different components (i.e. sub-models) of a machine learning model. The federated learning system of the embodiment of this disclosure trains the machine learning model using a second-order gradient descent method, and therefore, a node device firstly generates the $i^{th}$ first-order gradient using a model output result of its own model, and then generates the $i^{th}$ scalar operator for determining the $i^{th}$ second-order gradient descent direction based on the $i^{th}$ model parameter of the $i^{th}$ sub-model and the $i^{th}$ first-order gradient. Illustratively, the federated learning system is composed of a node device A, a node device B and a node device C, which are responsible for iterative training of a first sub-model, a second sub-model and a third sub-model, respectively. In a process of the current round of iterative training, the node device A, the node device B and the node device C obtain model parameters $$w_t^{(A)}, w_t^{(B)}, w_t^{(C)}$$

and first-order gradients $$g_t^{(A)}, g_t^{(B)}, g_t^{(C)}$$

by combined calculation. Furthermore, each node device can only acquire the model parameter and the first-order gradient of a local sub-model, and cannot acquire the model parameters and the first-order gradients of the sub-models in other node devices. The $i^{th}$ node device determines the second-order gradient descent direction based on the $i^{th}$ model parameter and the $i^{th}$ first-order gradient of the $i^{th}$ sub-model.

The formula for calculating the second-order gradient descent direction $z_t$ is $z_t=-g_t+\gamma_t s_t+\alpha_t\theta_t$, where, $g_t$ is a first-order gradient of a complete machine learning model composed of all the sub-models, $$g_t = \begin{bmatrix} g_t^{(A)} \\ g_t^{(B)} \\ g_t^{(C)} \end{bmatrix},$$

$s_t$ is a model parameter difference vector of the complete machine learning model, $s_t=w_t-w_{t-1}$, $w_t$ is a model parameter of the complete machine learning model, $$w_t = \begin{bmatrix} w_t^{(A)} \\ w_t^{(B)} \\ w_t^{(C)} \end{bmatrix},$$

$\theta_t$ is a first-order gradient difference of the complete machine learning model, $\theta_t=g_t-g_{t-1}$, $\gamma_t$ and at are scalars, and $$\alpha_t = \frac{s_t^T g_t}{s_t^T \theta_t},\ \gamma_t = \frac{\theta_t^T g_t}{s_t^T \theta_t} - \alpha_t\beta_t,$$

and $$\beta_t = 1 + \frac{\theta_t^T \theta_t}{s_t^T \theta_t},$$

where, $$\theta_t^T$$

represents transpose of $\theta_t$. Therefore, the process for calculating the second-order gradient descent direction is actually the process for calculating scalar operators $$s_t^T g_t,\ \theta_t^T g_t,\ \theta_t^T \theta_t$$

and $$s_t^T \theta_t.$$

Step 202: Transmit an $i^{th}$ fusion operator to a next node device based on the $i^{th}$ scalar operator, the $i^{th}$ fusion operator being obtained by fusing scalar operators from a first scalar operator to the $i^{th}$ scalar operator.

After the $i^{th}$ node device obtains the $i^{th}$ scalar operator by calculation, fusion processing is performed on the $i^{th}$ scalar operator to obtain the $i^{th}$ fusion operator, and the $i^{th}$ fusion operator is transmitted to a next node device, so that the next node device cannot know a specific numerical value of the $i^{th}$ scalar operator to realize that each node device obtains the second-order gradient descent direction by combined calculation under the condition that specific model parameters of other node devices cannot be acquired.

Exemplarily, any node device in the federated learning system may serve as a starting point (i.e. the first node device) for calculating a second-order gradient. In the process of iterative model training, the combined calculation of the second-order gradient descent direction is performed by using the same node device as a starting point, or the combined calculation of the second-order gradient descent direction is performed by using each node device in the federal learning system alternately as a starting point, or the combined calculation of the second-order gradient descent direction is performed by using a random node device as a starting point in each round of training, which is not limited in the embodiment of this disclosure.

Step 203: Determine an $i^{th}$ second-order gradient descent direction of the $i^{th}$ sub-model based on the acquired second-order gradient scalar, the $i^{th}$ model parameter and the $i^{th}$ first-order gradient, the second-order gradient scalar being determined and obtained by the first node device based on an $n^{th}$ fusion operator.

In a federated learning system, the first node device may act as the starting point to start to transfer the fusion operator until an $n^{th}$ node device. The $n^{th}$ node device transfers an $n^{th}$ fusion operator to the first node device to complete a data transfer closed loop, and the first node device determines and obtains a second-order gradient scalar based on the $n^{th}$ fusion operator. Since the $n^{th}$ fusion operator is obtained by gradually fusing a first scalar operator to an $n^{th}$ scalar operator, even if the first node device obtains the $n^{th}$ fusion operator, specific numerical values of the second scalar operator to the $n^{th}$ scalar operator cannot be known. In addition, the fusion operators acquired by other node devices are obtained by fusing data of the first n−1 node devices, and the model parameters and sample data of any node device cannot be known. Furthermore, in order to prevent that the second node device directly acquires the first fusion operator of the first node device, resulting in data leakage of the first node device, in a exemplarily implementation, the first node device encrypts the first scalar operator, for example, adds a random number, and performs decryption after finally acquiring the $n^{th}$ fusion operator, for example, subtracts the corresponding random number.

The $i^{th}$ second-order gradient descent direction is $$z_t^{(i)} = -g_t^{(i)} + \gamma_t s_t^{(i)} + \alpha_t \theta_t^{(i)},$$

and therefore the $i^{th}$ node device determines the $i^{th}$ second-order gradient descent direction $$z_t^{(i)}$$

based on the acquired second-order gradient scalars $\gamma_t$ and $\alpha_t$, as well as the $i^{th}$ first-order gradient $$g_t^{(i)}$$

and the $i^{th}$ model parameter $$w_t^{(i)}.$$

Step 204: Update the $i^{th}$ sub-model based on the $i^{th}$ second-order gradient descent direction to obtain model parameters of the $i^{th}$ sub-model during a $(t+1)^{th}$ round of iterative training.

In one exemplarily implementation, the $i^{th}$ node device updates the model parameter of the $i^{th}$ sub-model based on the generated $i^{th}$ second-order gradient descent direction to complete a current round of iterative model training. After all node devices have completed model training one time, next-time iterative training is performed on the updated model until training is completed.

Exemplarily, model training can be stopped when a training end condition is satisfied. The training end condition includes at least one of convergence of model parameters for all sub-models, convergence of model loss functions for all the sub-models, a number of training times reaching a threshold, and training duration reaching a duration threshold.

Exemplarily, when a learning rate (namely, step length) of iterative model training is 1, the model parameter is updated according to $$w_{t+1}^{(i)} = w_t^{(i)} + z_t^{(i)};$$

alternatively, the federated learning system may also determine an appropriate learning rate based on a current model, and update the model parameter according to $$w_{t+1}^{(i)} = w_t^{(i)} + \eta z_t^{(i)},$$

where, $\eta$ is the learning rate, $$w_{t+1}^{(i)}$$

is the model parameter of the $i^{th}$ sub-model after a $(t+1)^{th}$ round of iterative updating, and $$w_t^{(i)}$$

is the model parameter of the $i^{th}$ sub-model after a $t^{th}$ round of iterative updating.

In the embodiment of this disclosure, the second-order gradient descent direction of each sub-model is jointly calculated by transferring the fusion operators among the n node devices in the federated learning system to complete iterative model training, and a second-order gradient descent method can be used for training a machine learning model without relying on a third-party node; compared with a method using a trusted third party to perform model training in the related art, the problem of high single-point centralized security risk caused by single-point storage of a private key can be avoided, the security of federated learning is enhanced, and implementation of practical applications is facilitated.

Figure 3:
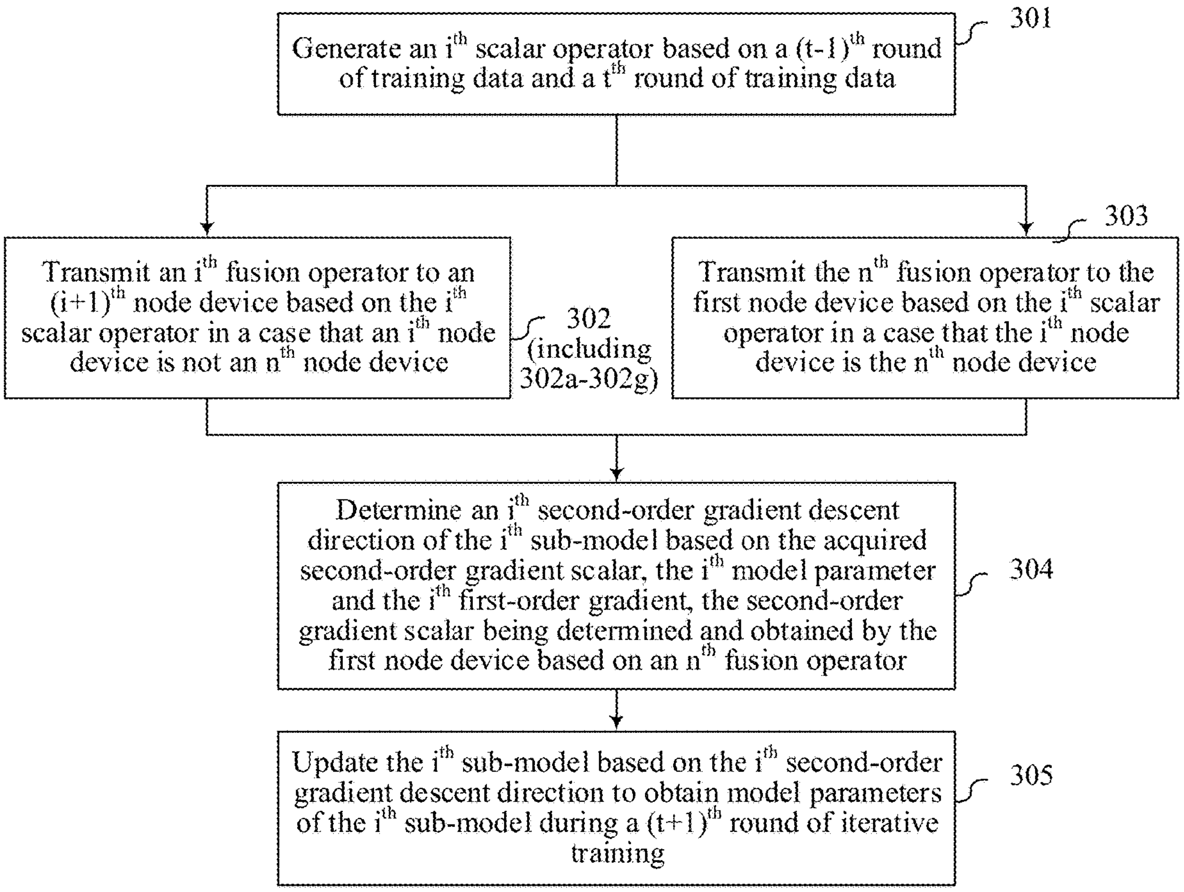
FIG. 3 is a flowchart of a model training method for federated learning provided by another exemplary embodiment of this disclosure.

In an exemplarily implementation, the n node devices in the federated learning system jointly calculate the second-order gradient scalar by transferring the scalar operators. In the transfer process, in order to avoid that a next node device can acquire the scalar operators of the first node device to the previous node device, and then obtain data such as the model parameter, each node device performs fusion processing on the $i^{th}$ scalar operator to obtain the $i^{th}$ fusion operator, and performs combined calculation using the $i^{th}$ fusion operator. FIG. 3 shows a flowchart of a model training method for federated training provided by another exemplary embodiment of this disclosure. This embodiment is described by using an example in which the method is applied to the node device in the federated learning system shown in FIG. 1. The method includes the following step.

Step 301: Generate an $i^{th}$ scalar operator based on a $(t-1)^{th}$ round of training data and a $t^{th}$ round of training data.

For the specific implementation of step 301, reference may be made to step 201, and details are not described again in this embodiment of this disclosure.

Step 302: Transmit an $i^{th}$ fusion operator to an $(i+1)^{th}$ node device based on the $i^{th}$ scalar operator when an $i^{th}$ node device is not an $n^{th}$ node device.

A federated learning system includes n node devices, and for the first node device to an $(n-1)^{th}$ node device, after calculating the $i^{th}$ scalar operator, an $i^{th}$ fusion operator is transferred to the $(i+1)^{th}$ node device, so that the $(i+1)^{th}$ node device continues to calculate a next fusion operator.

Figure 4:
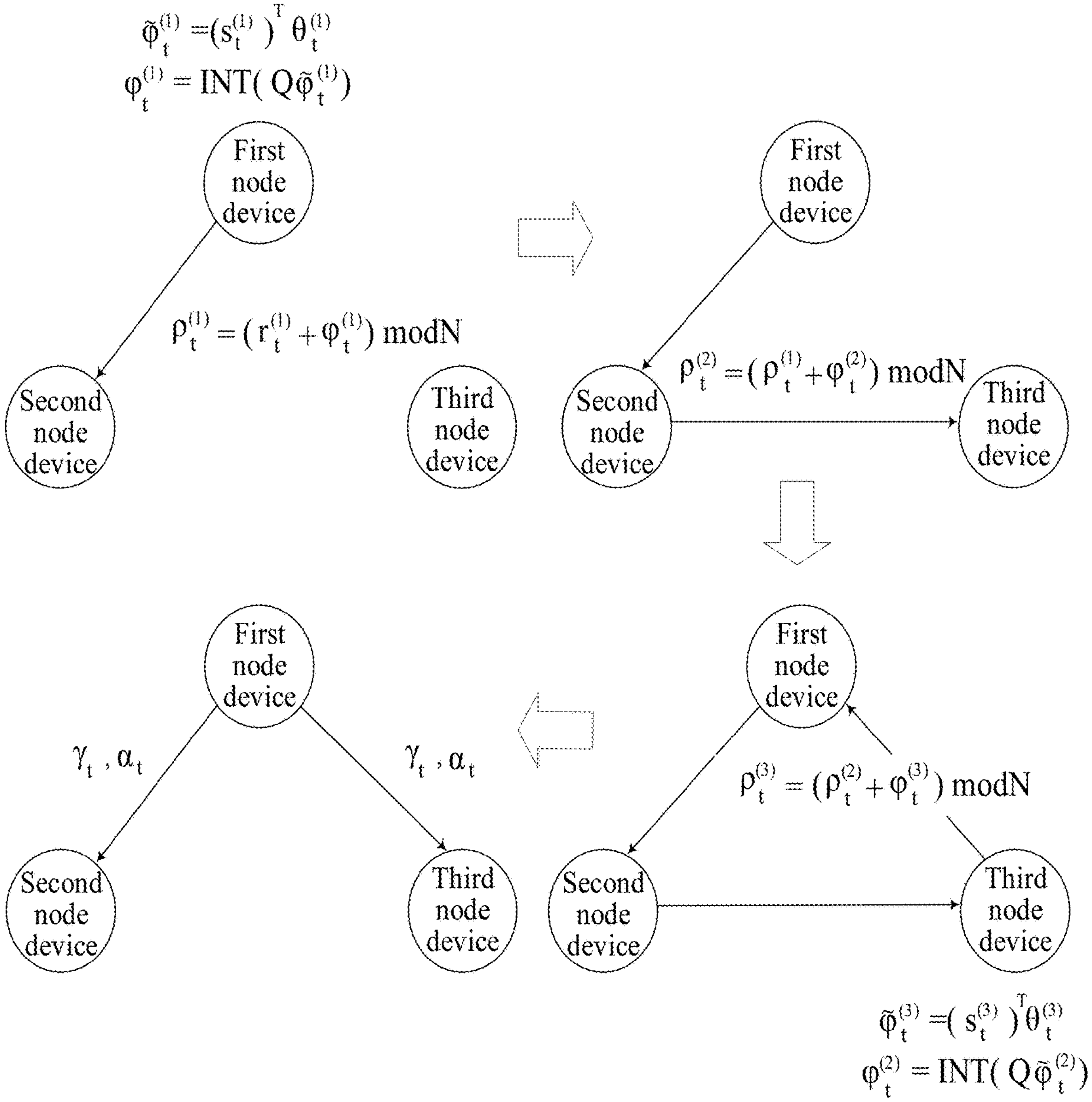
FIG. 4 is a schematic diagram of a process for calculating a second-order gradient scalar provided by an exemplary embodiment of this disclosure.

Illustratively, as shown in FIG. 4, the federated learning system is composed of a first node device, a second node device and a third node device, where, the first node device transmits a first fusion operator to the second node device based on a first scalar operator, the second node device transmits a second fusion operator to the third node device based on a second scalar operator and the first fusion operator, and the third node device transmits a third fusion operator to the first node device based on a third scalar operator and the second fusion operator.

For a process of obtaining the $i^{th}$ fusion operator based on the $i^{th}$ scalar operator, in one exemplarily implementation, when the node device is the first node device, step 302 includes the following steps.

Step 302*a*: Generate a random number.

Since the first node device is a starting point of a process for combined calculation of a second-order gradient descent direction, data transmitted to the second node device is only related to the first scalar operator, and scalar operators of other node devices are not fused. In order to avoid that the second node device acquires a specific numerical value of the first scalar operator, the first node device generates the random number for generating the first fusion operator. Since the random number is only stored in the first node device, the second node device cannot know the first scalar operator.

In one exemplarily implementation, the random number is an integer for ease of calculation. Exemplarily, the first node device uses the same random number in the process of iterative training each time, or the first node device randomly generates a new random number in the process of iterative training each time.

Step 302*b*: Generate the first fusion operator based on the random number and the first scalar operator, the random integer being secret to other node device.

The first node device generates the first fusion operator based on the random number and the first scalar operator, and the random number does not come out of the domain, namely, only the first node device in the federated learning system can acquire a numerical value of the random number.

For the process of generating the first fusion operator based on the random number and the first scalar operator, in one exemplarily implementation, step 302*b* includes the following steps.

Step 1: Perform a rounding operation on the first scalar operator.

It can be seen from the above-mentioned embodiment of this disclosure that the scalar operators required to be calculated in the second-order gradient calculation process include $$s_t^T g_t, \theta_t^T g_t, \theta_t^T \theta_t$$

and $$s_t^T \theta_t,$$

and the embodiments of this disclosure illustrate the process of calculating the scalar operator by taking $$\tilde{\varphi}_t^{(i)} = \left(s_t^{(i)}\right)^T \theta_t^{(i)}$$

as an example, and calculation processes of other scalar operators are similar to the calculation process of $$\left(s_t^{(i)}\right)^T \theta_t^{(i)},$$

and the embodiment of this disclosure will not be described in detail herein.

Firstly, the first node device performs the rounding operation on the first scalar operator and converts a floating point number $$\tilde{\varphi}_t^{(1)}$$

into an integer $$\varphi_t^{(1)}, \varphi_t^{(1)} = INT\left(Q\tilde{\varphi}_t^{(1)}\right),$$

where, INT(x) denotes rounding x. Q is an integer with a greater numerical value, and the numerical value of Q determines a retention degree of floating point precision, the greater Q is, the higher the retention degree of the floating point precision is. It is to be understood that, the rounding and modulo operations are optional, if the rounding operation is not considered, then $$\varphi_t^{(1)} = \tilde{\varphi}_t^{(1)}.$$

Step 2: Determine a first operator to be fused based on the first scalar operator after the rounding operation and the random number.

In one exemplarily implementation, the first node device performs arithmetic summation on the random number $$r_t^{(1)}$$

and the first scalar operator $$\varphi_t^{(1)}$$

after the rounding operation to determine the first operator to be fused $$\left(r_t^{(1)} + \varphi_t^{(1)}\right).$$

Step 3: Perform a modulo operation on the first operator to be fused to obtain the first fusion operator.

If the first node device uses the same random number in a process of each round of training, and directly performs a simple basic operation on the first scalar operator and the random number to obtain the first fusion operator, the second node device may speculate the numerical value of the random number after multiple rounds of training. Therefore, in order to further improve the security of data and prevent data leakage of the first node device, the first node device performs the modulo operation on the first operator to be fused, and transmits a remainder obtained by the modulo operation as the first fusion operator to the second node device, so that the second node device cannot determine the variation range of the first scalar operator even after multiple times of iterative training, thereby further improving the security and confidentiality of the model training process.

The first node device performs the rounding operation on the first operator to be fused $$\left(r_t^{(1)} + \varphi_t^{(1)}\right)$$

to obtain the first fusion operator $$\rho_t^{(1)},$$

namely $$\rho_t^{(1)} = \left(r_t^{(1)} + \varphi_t^{(1)}\right)$$

mod N, where, N is a prime number with a greater numerical value, and it is generally required that N is greater than $$n\varphi_t^{(i)}.$$

It is to be understood that the rounding and modulo operations are optional, if the rounding operation and the modulo operation are not considered, then $$\rho_t^{(1)} = \tilde{\varphi}_t^{(1)}.$$

Step 302*c*: Transmit the first fusion operator to the second node device.

After generating the first fusion operator, the first node device transmits the first fusion operator to the second node device, so that the second node device generates the second fusion operator based on the first fusion operator, and so on until an $n^{th}$ fusion operator is obtained.

For the process of obtaining the $i^{th}$ fusion operator based on the $i^{th}$ scalar operator, in one exemplarily implementation, when the node device is not the first node device and not the $n^{th}$ node device, the following steps are further included before step 302.

Receive an $(i-1)^{th}$ fusion operator transmitted by an $(i-1)^{th}$ node device.

After obtaining the local fusion operator by calculation, each node device in the federated learning system transfers the local fusion operator to a next node device, so that the next node device continues to calculate a new fusion operator; therefore, the $i^{th}$ node device firstly receives the $(i-1)^{th}$ fusion operator transmitted by the $(i-1)^{th}$ node device before calculating the $i^{th}$ fusion operator.

Step 302 includes the following steps.

Step 302*d*: Perform a rounding operation on the $i^{th}$ scalar operator.

Similar to the calculation process of the first fusion operator, the $i^{th}$ node device firstly converts the floating point number $$\tilde{\varphi}_t^{(i)}$$

to an interger $$\varphi_t^{(i)}, \varphi_t^{(i)} = \mathrm{INT}\left(Q\tilde{\varphi}_t^{(i)}\right),$$

where, Q used in the calculation process of each node device is the same. It is to be understood that the rounding and modulo operations are optional, if the rounding operation is not considered, then $$\varphi_t^{(i)} = \tilde{\varphi}_t^{(i)}.$$

Step 302*e*: Determine an $i^{th}$ operator to be fused based on the $i^{th}$ scalar operator after the rounding operation and the $(i-1)^{th}$ fusion operator.

In one exemplarily implementation, the $i^{th}$ node device performs an addition operation on the $(i-1)^{th}$ fusion operator $$\rho_t^{(i-1)}$$

and the $i^{th}$ scalar operator $$\varphi_t^{(i)}$$

to determine the $i^{th}$ operator to be fused $$\left(\rho_t^{(i-1)} + \varphi_t^{(i)}\right).$$

Step 302*f*: Perform a modulo operation on the $i^{th}$ operator to be fused to obtain the $i^{th}$ fusion operator.

The $i^{th}$ node device performs the modulo operation on a sum of the $(i-1)^{th}$ fusion operator and the $i^{th}$ scalar operator (namely, the $i^{th}$ operator to be fused) to obtain the $i^{th}$ fusion operator $$\rho_t^{(i)},\ \rho_t^{(i)} = \left(\rho_t^{(i-1)} + \varphi_t^{(i)}\right) \bmod N,$$

mod N, where, N used by each node device when performing the modulo operation is equal.

When N is a prime number great enough, for example, when N is greater than $$n\varphi_t^{(1)},\ \rho_t^{(i)} = \left(\rho_t^{(i-1)} + \varphi_t^{(i)}\right) \bmod N = \left(r_t^{(1)} + \varphi_t^{(1)} + \ldots + \varphi_t^{(i)}\right) \bmod N$$

is established regardless of the integer value of $$r_t^{(1)}.$$

It needs to be understood that the rounding and modulo operations are optional, and if the rounding operation and the modulo operation are not considered, the $i^{th}$ fusion operator is the sum of i scalar operators, i.e.

$$\rho_t^{(i)} = \tilde{\varphi}_t^{(1)} + \ldots + \tilde{\varphi}_t^{(i)},$$

where a random number is fused in the first scalar operator.

Step 302*g*: Transmit the $i^{th}$ fusion operator to an $(i+1)^{th}$ node device.

After the $i^{th}$ node device generates the $i^{th}$ fusion operator, the $i^{th}$ fusion operator is transmitted to the $(i+1)^{th}$ node device, so that the $(i+1)^{th}$ node device generates an $(i+1)^{th}$ fusion operator based on the $i^{th}$ fusion operator, and so on until the $n^{th}$ fusion operator is obtained.

Step 303: Transmit the $n^{th}$ fusion operator to the first node device based on the $i^{th}$ scalar operator when the $i^{th}$ node device is the $n^{th}$ node device.

When the fusion operator is transferred to the $n^{th}$ node device, the $n^{th}$ node device obtains the $n^{th}$ fusion operator by calculation based on the $n^{th}$ scalar operator and the $(n-1)^{th}$ fusion operator. Since the scalar required to calculate the second-order gradient descent direction requires the sum of scalar operators obtained by the n node devices by calculation, for example, for a federated calculating system composed of three node devices, $$\theta_t^T\theta_t = \left(\theta_t^{(1)}\right)^T\theta_t^{(1)} + \left(\theta_t^{(2)}\right)^T\theta_t^{(2)} + \left(\theta_t^{(3)}\right)^T\theta_t^{(3)},$$
$$s_t^T\theta_t = \left(s_t^{(1)}\right)^T\theta_t^{(1)} + \left(s_t^{(2)}\right)^T\theta_t^{(2)} + \left(s_t^{(3)}\right)^T\theta_t^{(3)},$$
$$s_t^T g_t = \left(s_t^{(1)}\right)^T g_t^{(1)} + \left(s_t^{(2)}\right)^T g_t^{(2)} + \left(s_t^{(3)}\right)^T g_t^{(3)},$$
$$\theta_t^T g_t = \left(\theta_t^{(1)}\right)^T g_t^{(1)} + \left(\theta_t^{(2)}\right)^T g_t^{(2)} + \left(\theta_t^{(3)}\right)^T g_t^{(3)},$$

and the random number generated by the first node device is also fused in the $n^{th}$ fusion operator, the $n^{th}$ node device needs to transmit the $n^{th}$ fusion operator to the first node device, and finally the first node device obtains the second-order gradient scalar by calculation.

The process that the $n^{th}$ node device obtains the $n^{th}$ fusion operator by calculation further includes the following steps before step 303.

Receive the $(n-1)^{th}$ fusion operator transmitted by the $(n-1)^{th}$ node device.

After receiving the $(n-1)^{th}$ fusion operator transmitted by the $(n-1)^{th}$ node device, the $n^{th}$ node device starts to calculate the $n^{th}$ fusion operator.

Step 303 further includes the following steps.

Step 4: Perform a rounding operation on the $n^{th}$ scalar operator.

The $n^{th}$ node device performs the rounding operation on the $n^{th}$ scalar operator to convert the floating point number $$\tilde{\varphi}_t^{(n)} = \left(s_t^{(n)}\right)^T\theta_t^{(n)}$$

to an integer $$\varphi_t^{(n)},\ \varphi_t^{(n)} = \mathrm{INT}\left(Q\tilde{\varphi}_t^{(n)}\right),$$

where Q is an integer with a greater value and is equal to Q used by the first n−1 node devices. Performing rounding on the $n^{th}$ scalar operator facilitates subsequent complex operations, and can also increases security to prevent data leakage.

Step 5: Determine an $n^{th}$ operator to be fused based on the $n^{th}$ scalar operator after the rounding operation and the $(n-1)^{th}$ fusion operator.

The $n^{th}$ node device determines the $n^{th}$ operator to be fused $$\left(\rho_t^{(n-1)} + \varphi_t^{(n)}\right)$$

based on the $(n-1)^{th}$ fusion operator $$\rho_t^{(n-1)}$$

and the first scalar operator $$\varphi_t^{(n)}$$

after the rounding operation.

Step 6: Perform a modulo operation on the $n^{th}$ operator to be fused to obtain the $n^{th}$ fusion operator.

The $n^{th}$ node device performs a rounding operation on the $n^{th}$ operator to be fused $$\left(\rho_t^{(n-1)} + \varphi_t^{(n)}\right)$$

to obtain the $n^{th}$ fusion operator $$\rho_t^{(n)} = \left(\rho_t^{(n-1)} + \varphi_t^{(n)}\right) \bmod N.$$

Step 7: Transmit the $n^{th}$ fusion operator to the first node device.

After the $n^{th}$ node device generates the $n^{th}$ fusion operator, the $n^{th}$ fusion operator is transmitted to the first node device, so that the first node device obtains a second-order gradient scalar required for calculating the second-order gradient based on the $n^{th}$ fusion operator.

In one exemplarily implementation, when the node device is the first node device, before step 304, the following steps are further included.

Step 8: Receive the $n^{th}$ fusion operator transmitted by the $n^{th}$ node device.

After receiving the $n^{th}$ fusion operator transmitted by the $n^{th}$ node device, the first node device performs an inverse operation of the above-mentioned operation based on the $n^{th}$ fusion operator, and restores the first scalar operator and the $n^{th}$ scalar operator.

Step 9: Restore an accumulation result of the first scalar operator to the $n^{th}$ scalar operator based on the random number and the $n^{th}$ fusion operator.

Since the $n^{th}$ fusion operator is $$\rho_t^{(n)} = \left(r_t^{(1)} + \varphi_t^{(1)} + \ldots + \varphi_t^{(n)}\right) \bmod N,$$

and N is a prime number greater than $$\varphi_t^{(1)} + \ldots + \varphi_t^{(n)},$$

thus, if $$s_t^T\theta_t = \left(s_t^{(1)}\right)^T\theta_t^{(1)} + \left(s_t^{(2)}\right)^T\theta_t^{(2)} + \ldots + \left(s_t^{(n)}\right)^T\theta_t^{(n)}$$

is to be calculated, it can be calculated only according to $$\theta_t^{(1)} + \left(s_t^{(2)}\right)^T\theta_t^{(2)} + \ldots + \left(s_t^{(n)}\right)^T\theta_t^{(n)} = \frac{\left(r_t^{(1)} + \varphi_t^{(1)} + \ldots + \varphi_t^{(n)} - r_t^{(1)}\right) \bmod N}{Q}.$$

In this process, since the first node device can only obtain the accumulation result $$\varphi_t^{(2)} + \ldots + \varphi_t^{(n)},$$

it cannot know the specific numerical values of $$\varphi_t^{(2)} \text{ to } \varphi_t^{(n)},$$

thereby ensuring the security of model training.

Step 10: Determine the second-order gradient scalar based on the accumulation result.

The first node device obtains the accumulation result of four scalar operators (namely, $$s_t^T g_t,\ \theta_t^T g_t,\ \theta_t^T\theta_t \text{ and } s_t^T\theta_t)$$

by calculating in the above-mentioned manner, determines second-order gradient scalars $\beta_t$, $\gamma_t$ and $\alpha_t$ using the accumulation result, and transmits the second-order gradient scalar obtained by calculation to the second node device to the $n^{th}$ node device, so that each node device calculates a second-order gradient descent direction of a local sub-model thereof based on the received second-order gradient scalar.

Step 304: Determine an $i^{th}$ second-order gradient descent direction of the $i^{th}$ sub-model based on the acquired second-order gradient scalar, the $i^{th}$ model parameter and the $i^{th}$ first-order gradient, the second-order gradient scalar being determined and obtained by the first node device based on an $n^{th}$ fusion operator.

Step 305: Update the $i^{th}$ sub-model based on the $i^{th}$ second-order gradient descent direction to obtain model parameters of the $i^{th}$ sub-model during a $(t+1)^{th}$ round of iterative training.

For the specific implementation of steps 304 to 305, reference may be made to steps 203 to 204, and details are not described again in the embodiments of this disclosure.

In the embodiment of this disclosure, when the node device is the first node device, the first fusion operator is generated by generating the random number and performing the rounding operation and the modulo operation on the random number and the first scalar operator, so that the second node device cannot obtain a specific numerical value of the first scalar operator; and when the node device is not the first node device, fusion processing is performed on the received $(i-1)^{th}$ fusion operator and the $i^{th}$ scalar operator to obtain the $i^{th}$ fusion operator, and the $i^{th}$ fusion operator is transmitted to the next node device, so that each node device in the federated learning system cannot know the specific numerical value of the scalar operators of other node devices, further improving the security and confidentiality of iterative model training, so that model training is completed without relying on a third-party node.

It is to be understood that, when there are only two participants in the federated learning system (i.e. n=2), e.g., only participants A and B, the two participants may utilize a differential privacy mechanism to protect their respective local model parameters and first-order gradient information. The differential privacy mechanism is a mechanism that protects private data by adding random noise. For example, the participants A and B cooperate to calculate the second-order gradient scalar operator $$s_t^T\theta_t = \left(s_t^{(A)}\right)^T\theta_t^{(A)} + \left(s_t^{(B)}\right)^T\theta_t^{(B)},$$

which may be accomplished in the following manner.

The participant A calculates a part of the second-order gradient scalar operator, $$\left(s_t^{(A)}\right)^T\theta_t^{(A)} + \sigma^{(A)},$$

and transmits it to the participant B. $\sigma^{(A)}$ is the random noise (i.e. random number) generated by the participant A. Then, the participant B may obtain an approximate second-order gradient scalar operator $$s_t^T\theta_t = \left(s_t^{(A)}\right)^T\theta_t^{(A)} + \left(s_t^{(B)}\right)^T\theta_t^{(B)} + \sigma^{(A)}$$

by calculation.

Accordingly, the participant B calculates $$\left(s_t^{(B)}\right)^T\theta_t^{(B)} + \sigma^{(B)},$$

and transmits it to the participant A. $\sigma^{(B)}$ is the random noise (i.e. random number) generated by the participant B. Then, the participant A may obtain an approximate second-order gradient scalar operator $$s_t^T\theta_t = \left(s_t^{(A)}\right)^T\theta_t^{(A)} + \left(s_t^{(B)}\right)^T\theta_t^{(B)} + \sigma^{(A)}$$

by calculation.

By controlling the magnitude of the random noise $\sigma^{(A)}$ and $\sigma^{(B)}$ and the statistical distribution condition, the influence of the added random noise on calculation accuracy can be controlled, and a balance between security and accuracy can be achieved according to the business scenario.

When there are only two participants (i.e. n=2), for calculation of other second-order gradient scalar operators, such as $$\theta_t^T g_t, \theta_t^T g_t$$

and $$\theta_t^T\theta_t,$$

a similar method can be used for calculation. After obtaining the second-order gradient scalar operator, the participants A and B can calculate the second-order gradient scalars respectively, and then calculate the second-order gradient descent direction and a step length (i.e. learning rate), and then update the model parameter.

In a case of n=2, by using the differential privacy mechanism, the two node devices respectively acquire the scalar operator, where the random noise is added, transmitted by the other node device, and obtain the respective second-order gradient descent direction by calculation based on the received scalar operator where the random noise is added and the scalar operator corresponding to the local model, which can ensure that the node device cannot acquire the local first-order gradient information and the model parameter of the other node device on the basis of ensuring that a second-order gradient direction error obtained by calculation is small, so as to meet the requirements of federated learning for data security.

Figure 5:
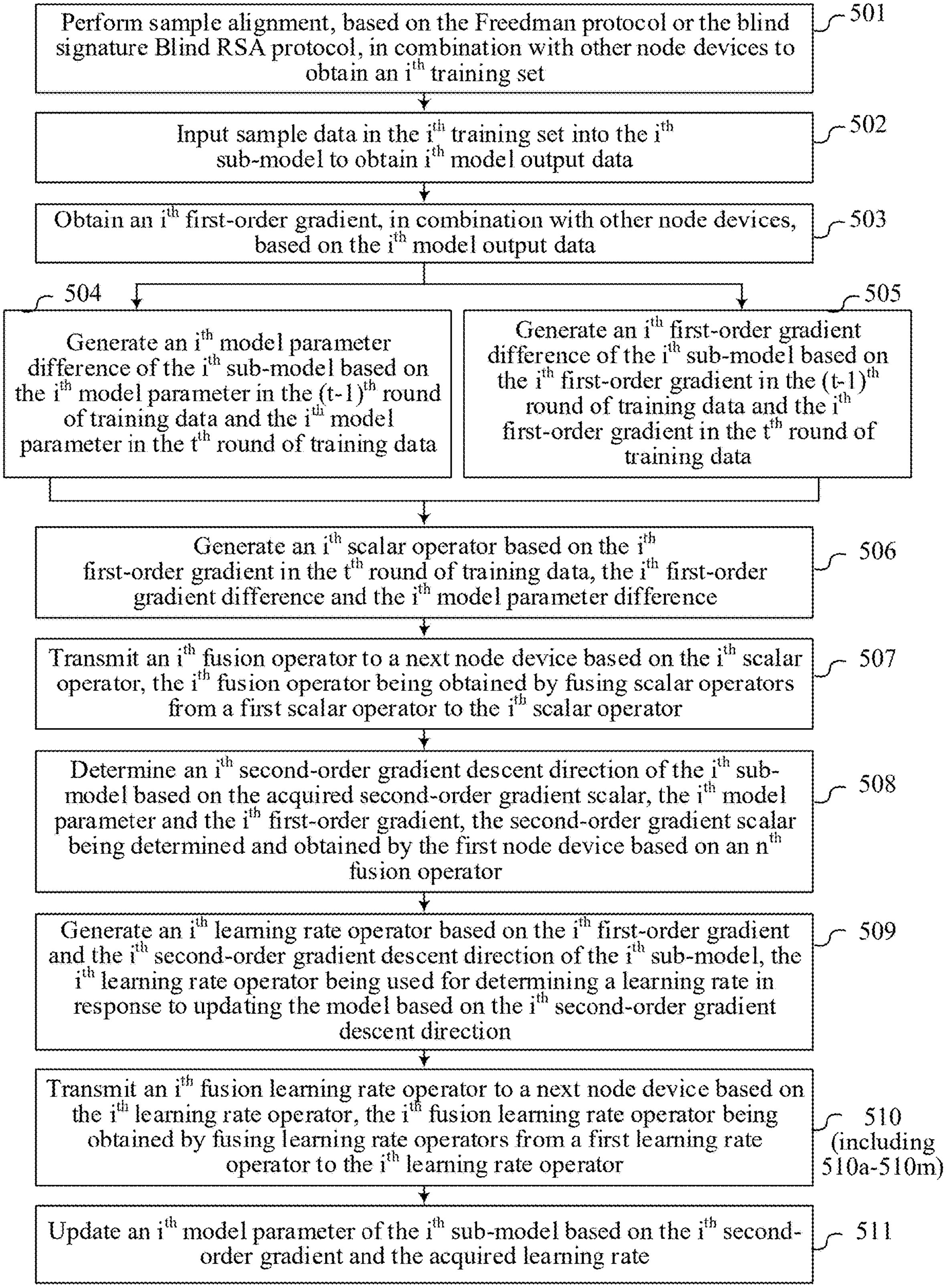
FIG. 5 is a flowchart of a model training method for federated learning provided by another exemplary embodiment of this disclosure.

The various embodiments described above show the process in which various node devices jointly calculate the second-order gradient descent direction based on the first-order gradient. Different node devices have different sample data, and sample subjects corresponding to the sample data thereof may be inconsistent. If the sample data belonging to different sample subjects is used for model training, it is meaningless, which may result in model performance degradation. Therefore, before performing iterative model training, the node devices in the federated learning system firstly cooperate for sample alignment to screen sample data which is meaningful to each node device. FIG. 5 shows a flowchart of a model training method for federated training provided by another exemplary embodiment of this disclosure. This embodiment is described by using an example in which the method is applied to the node device in the federated learning system shown in FIG. 1. The method includes the following step.

Step 501: Perform sample alignment, based on the Freedman protocol or the blind signature Blind RSA protocol, in combination with other node devices to obtain an $i^{th}$ training set.

Each node in the federated learning system has different sample data, for example, participants of federated learning include a bank A, a merchant B and an online payment platform C; the sample data owned by the bank A includes asset conditions of a user corresponding to the bank A; the sample data owned by the merchant B includes commodity purchase data of a user corresponding to the merchant B; the sample data owned by the online payment platform C is a transaction record of a user of the online payment platform C; when the bank A, the merchant B and the online payment platform C jointly perform federated calculation, a common user group of the bank A, the merchant B and the online payment platform C needs to be screened out, and then corresponding sample data of the common user group in the above-mentioned three participants is meaningful for model training of the machine learning model. Therefore, before performing model training, each node device needs to combine with other node devices to perform sample alignment, so as to obtain a respective training set.

After sample alignment, sample objects corresponding to the first training set to an $n^{th}$ training set are consistent. In one exemplarily implementation, each participant marks the sample data in advance according to a uniform standard so that marks corresponding to sample data belonging to the same sample object are the same. Each node device performs combined calculation, and performs sample alignment based on the sample mark, for example, an intersection of the sample marks in n-party original sample data sets is taken, and then a local training set is determined based on the intersection of the sample mark.

Exemplarily, each node device inputs all the sample data corresponding to the training set into a local sub-model during each round of iterative training; alternatively, when the data volume in the training set is large, in order to reduce the calculation amount and obtain a better training effect, each node device only processes a small batch of training data in iterative training each time, for example, each batch of training data includes 128 sample data, and each participant is required to coordinate to batch the training sets and select small batches of training sets, so as to ensure that training samples of all participants are aligned in each round of iterative training.

Step 502: Input sample data in the $i^{th}$ training set into the $i^{th}$ sub-model to obtain $i^{th}$ model output data.

In combination with the above-mentioned example, the first training set corresponding to the bank A includes asset conditions of the common user group, the second training set corresponding to the merchant B is commodity purchase data of the common user group, the third training set corresponding to the online payment platform C includes the transaction record of the common user group, and node devices of the bank A, the merchant B and the online payment platform C respectively input the corresponding training set into the local sub-model to obtain the model output data.

Step 503: Obtain an $i^{th}$ first-order gradient, in combination with other node devices, based on the $i^{th}$ model output data.

Each node device securely calculates the $i^{th}$ first-order gradient through cooperation, and obtains an $i^{th}$ model parameter and the $i^{th}$ first-order gradient in a plaintext form respectively.

Step 504: Generate an $i^{th}$ model parameter difference of the $i^{th}$ sub-model based on the $i^{th}$ model parameter in the $(t-1)^{th}$ round of training data and the $i^{th}$ model parameter in the $t^{th}$ round of training data.

Step 505: Generate an $i^{th}$ first-order gradient difference of the $i^{th}$ sub-model based on the $i^{th}$ first-order gradient in the $(t-1)^{th}$ round of training data and the $i^{th}$ first-order gradient in the $t^{th}$ round of training data.

There is no strict sequential order between step 504 and step 505, which may be performed synchronously.

Since a second-order gradient descent direction is $z_t=-g_t+\gamma_t s_t+\alpha_t\theta_t$, and second-order gradient scalars $\alpha_t$ and $\gamma_t$ therein are also obtained based on $\theta_t$, $g_t$ and $s_t$ by calculation, and taking three node devices as an example, $$s_t=\begin{bmatrix}w_t^{(1)}\\w_t^{(2)}\\w_t^{(3)}\end{bmatrix}-\begin{bmatrix}w_{t-1}^{(1)}\\w_{t-1}^{(2)}\\w_{t-1}^{(3)}\end{bmatrix}=\begin{bmatrix}s_t^{(1)}\\s_t^{(2)}\\s_t^{(3)}\end{bmatrix},\ \theta_t=\begin{bmatrix}g_t^{(1)}\\g_t^{(2)}\\g_t^{(3)}\end{bmatrix}-\begin{bmatrix}g_{t-1}^{(1)}\\g_{t-1}^{(2)}\\g_{t-1}^{(3)}\end{bmatrix}=\begin{bmatrix}\theta_t^{(1)}\\\theta_t^{(2)}\\\theta_t^{(3)}\end{bmatrix},$$

thus, each node device firstly generates the $i^{th}$ model parameter difference $$s_t^{(i)}$$

based on the $i^{th}$ model parameter $$w_{t-1}^{(i)}$$

after the $(t-1)^{th}$ round of iterative training and the $i^{th}$ model parameter $$w_t^{(i)}$$

after the $i^{th}$ round or iterative training, and generates the $i^{th}$ first-order gradient difference $$\theta_t^{(i)}$$

of the $i^{th}$ sub-model based on the $i^{th}$ first-order gradient after the $(t-1)^{th}$ round of iterative training and the $i^{th}$ first-order gradient after the $t^{th}$ round of iterative training.

Step 506: Generate an $i^{th}$ scalar operator based on the $i^{th}$ first-order gradient in the $t^{th}$ round of training data, the $i^{th}$ first-order gradient difference and the $i^{th}$ model parameter difference.

The $i^{th}$ node device calculates the $i^{th}$ scalar operator $$(\theta_t^{(i)})^T\theta_t^{(i)},\ (s_t^{(i)})^T\theta_t^{(i)},\ (s_t^{(i)})^T g_t^{(i)},\ (\theta_t^{(i)})^T g_t^{(i)}$$

based on the $i^{th}$ model parameter difference $$s_t^{(i)},$$

the $i^{th}$ first-order gradient $$g_t^{(i)}$$

and the $i^{th}$ first-order gradient difference $$\theta_t^{(i)},$$

respectively.

Step 507: Transmit an $i^{th}$ fusion operator to a next node device based on the $i^{th}$ scalar operator, the $i^{th}$ fusion operator being obtained by fusing scalar operators from a first scalar operator to the $i^{th}$ scalar operator.

Step 508: Determine an $i^{th}$ second-order gradient descent direction of the $i^{th}$ sub-model based on the acquired second-order gradient scalar, the $i^{th}$ model parameter and the $i^{th}$ first-order gradient, the second-order gradient scalar being determined and obtained by the first node device based on an $n^{th}$ fusion operator.

The specific implementation of steps 507 to 508 may refer to steps 202 to 203 described above, and will not be repeated in the embodiment of this disclosure.

Step 509: Generate an $i^{th}$ learning rate operator based on the $i^{th}$ first-order gradient and the $i^{th}$ second-order gradient descent direction of the $i^{th}$ sub-model, the $i^{th}$ learning rate operator being used for determining a learning rate in response to updating the model based on the $i^{th}$ second-order gradient descent direction.

The learning rate, as a super parameter in supervised learning and deep learning, determines whether an objective function can converge to a local minimum value and when the objective function can converge to the local minimum value. A suitable learning rate enables the objective function to converge to the local minimum value within a suitable time. The above-mentioned embodiment of this disclosure illustrates the process of iterative model training by taking 1 as the learning rate, namely, the i$^{th}$ second-order gradient descent direction $$z_t^{(i)} = -g_t^{(i)} + \gamma_t s_t^{(i)} + \alpha_t \theta_t^{(i)}$$

as an example. In one exemplarily implementation, in order to further improve the efficiency of iterative model training, the embodiment of this disclosure performs model training by dynamically adjusting the learning rate.

A calculation formula (Hestenes-Stiefel formula) of the learning rate (i.e. step length) is as follows.

$$\eta = \frac{g_t^T \theta_t}{z_t^T \theta_t}$$

η is the learning rate, $$z_t^T$$

is a transpose of the second-order gradient descent direction of a complete machine learning model, $$g_t^T$$

is a transpose of the first-order gradient of the complete machine learning model, and $\theta_t$ is the first-order gradient difference of the complete machine learning model; therefore, on the premise of ensuring that each node device cannot acquire the first-order gradient and the second-order gradient descent direction of the i$^{th}$ sub-model in other node devices, the embodiment of this disclosure adopts a method same as that of calculating the second-order gradient scalar, and jointly calculates the learning rate by transferring fusion operators. The i$^{th}$ learning rate operator includes $$g_t^{(i)T} \theta_t^{(i)}$$

and $$z_t^{(i)T} \theta_t^{(i)}.$$

Step 510: Transmit an i$^{th}$ fusion learning rate operator to a next node device based on the i$^{th}$ learning rate operator, the i$^{th}$ fusion learning rate operator being obtained by fusing learning rate operators from a first learning rate operator to the i$^{th}$ learning rate operator.

For a process of generating the i$^{th}$ fusion learning rate operator based on the i$^{th}$ learning rate operator, in one exemplarily implementation, when the i$^{th}$ node device is the first node device, step 510 includes the following steps.

Step 510*a*: Generate a random number.

Since the first node device is a starting point for combined calculation of the learning rate, data transmitted to the second node device is only related to the first learning rate operator, and in order to avoid that the second node device acquires a specific numerical value of the first learning rate operator, the first node device generates the random number $$r_t^{(1)}$$

for generating the first fusion learning rate operator.

In one exemplarily implementation, the random number is an integer for ease of calculation.

Step 510*b*: Perform a rounding operation on the first learning rate operator.

The embodiment of this disclosure illustrates the process of calculating the scalar operator by taking $$\tilde{\varphi}_t^{(i)} = g_t^{(i)T} \theta_t^{(i)}$$

as an example, the calculation process of other scalar operators is the same as the calculation process of $$g_t^{(i)T} \theta_t^{(i)},$$

and the embodiment of this disclosure will not be described in detail herein. Firstly, the first node device performs the rounding operation on the first learning rate operator to convert a floating point number $$\tilde{\varphi}_t^{(1)}$$

into an integer $$\varphi_t^{(1)},\ \varphi_t^{(1)} = INT(Q\tilde{\varphi}_t^{(1)}).$$

Q is an integer with a greater numerical value, a numerical value thereof determines a retention degree of floating point precision, and the greater Q is, the higher the retention degree of the floating point precision is.

Step 510*c*: Determine a first learning rate operator to be fused based on the first learning rate operator after the rounding operation and the random number.

The first node device determines the first learning rate operator to be fused $$\left(r_t^{(1)} + \varphi_t^{(1)}\right)$$

based on the random number $$r_t^{(1)}$$

and the first learning rate operator $$\varphi_t^{(1)}$$

after the rounding operation.

Step 510*d*: Perform a modulo operation on the first learning rate operator to be fused to obtain the first fusion learning rate operator.

The first node device performs the modulo operation on the first learning rate operator to be fused, and transmits a remainder obtained by the modulo operation as the first fusion learning rate operator to the second node device, so that the second node device cannot determine the variation range of the first learning rate operator even after multiple times of iterative training, thereby further improving the security and confidentiality of the model training process.

The first node device performs the rounding operation on the first learning rate operator to be fused $$\left(r_t^{(1)} + \varphi_t^{(1)}\right),$$

so as to obtain the first fusion learning rate operator $$\rho_t^{(1)},$$

namely, $$\rho_t^{(1)} = \left(r_t^{(1)} + \varphi_t^{(1)}\right)$$

mod N, where N is a prime number with a greater numerical value, and it is generally required that N is greater than $$n\varphi_t^{(1)}.$$

Step 510*e*: Transmit the first fusion learning rate operator to the second node device.

When the $i^{th}$ node device is not the first node device and not the $n^{th}$ node device, the following steps are further included before step 510.

Receive an $(i-1)^{th}$ fusion learning rate operator transmitted by an $(i-1)^{th}$ node device.

Step 510 includes the following steps.

Step 510*f*: Perform a rounding operation on the $i^{th}$ learning rate operator.

Step 510*g*: Determine an $i^{th}$ learning rate operator to be fused based on the $i^{th}$ learning rate operator after the rounding operation and the $(i-1)^{th}$ fusion learning rate operator.

Step 510*h*: Perform a modulo operation on the $i^{th}$ learning rate operator to be fused to obtain the $i^{th}$ fusion learning rate operator.

Step 510*i*: Transmit the $i^{th}$ fusion learning rate operator to an $(i+1)^{th}$ node device.

When the $i^{th}$ node device is the $n^{th}$ node device, the following steps are further included before step 510.

Receive an $(n-1)^{th}$ fusion learning rate operator transmitted by the $(n-1)^{th}$ node device.

Step 510 further includes the following steps.

Step 510*j*: Perform a rounding operation on an $n^{th}$ learning rate operator.

Step 510*k*: Determine an $n^{th}$ learning rate operator to be fused based on the $n^{th}$ learning rate operator after the rounding operation and the $(n-1)^{th}$ fusion learning rate operator.

Step S101: Perform a modulo operation on the $n^{th}$ learning rate operator to be fused to obtain an $n^{th}$ fusion learning rate operator.

Step 510*m*: Transmit the $n^{th}$ fusion learning rate operator to the first node device.

Step 511: Update an $i^{th}$ model parameter of the $i^{th}$ sub-model based on the $i^{th}$ second-order gradient and the acquired learning rate.

Figure 6:
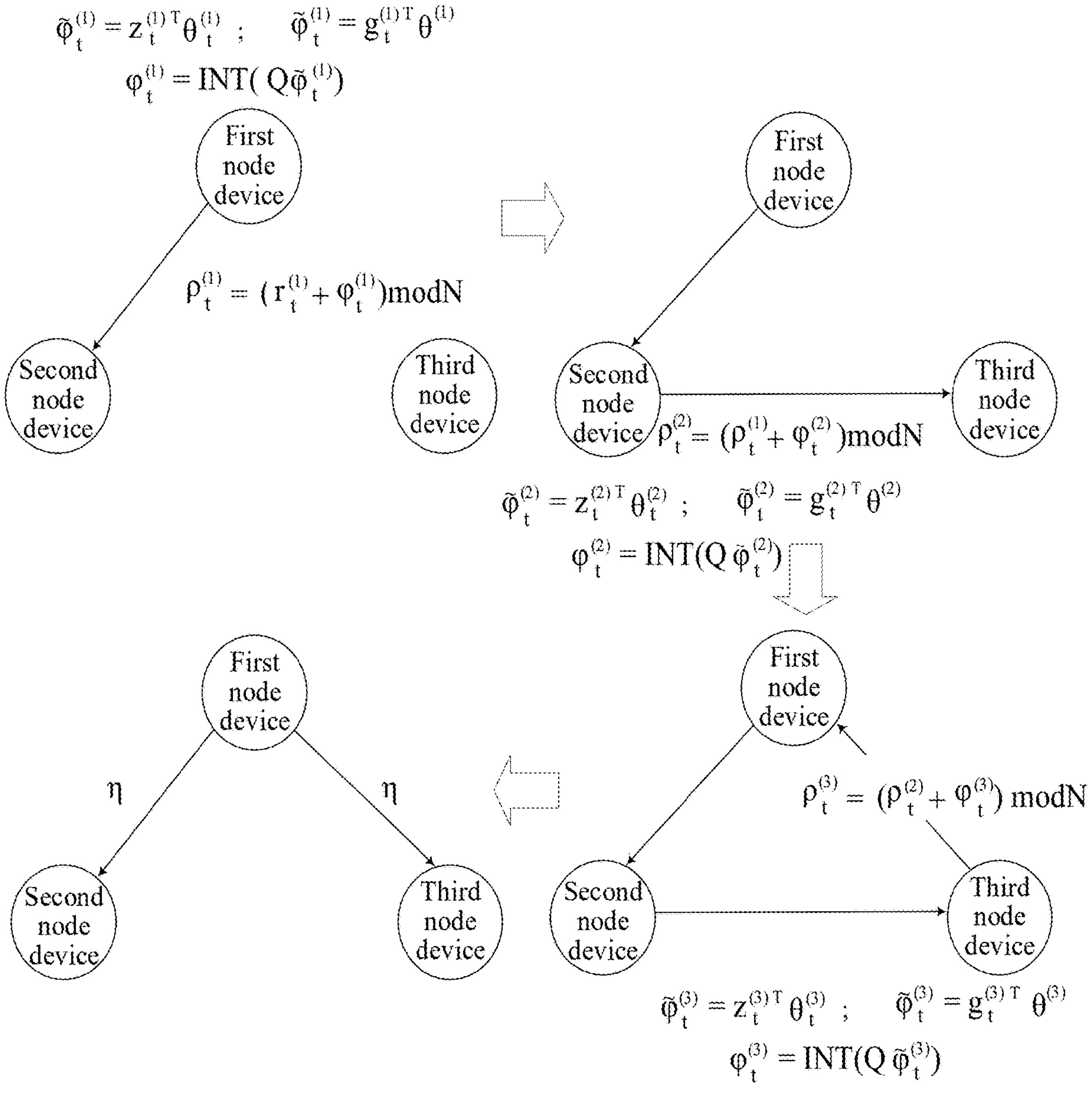
FIG. 6 is a schematic diagram of a process for calculating a learning rate provided by an exemplary embodiment of this disclosure.

As shown in FIG. 6, which shows a process for calculating a learning rate. The first node device generates the first fusion learning rate operator based on the first learning rate operator and a random number and transmits the first fusion learning rate operator to the second node device; the second node device generates a second fusion learning rate operator based on the first fusion learning rate operator and a second learning rate operator and transmits the second fusion learning rate operator to the third node device; the third node device generates a third fusion learning rate operator based on the second fusion learning rate operator and a third learning rate operator and transmits the third fusion learning rate operator to the first node device, so that the first node device restores and obtains an accumulation result of the first learning rate operator to the third learning rate operator based on the third fusion learning rate operator, then calculates the learning rate, and transmits the learning rate to the second node device and the third node device.

In one exemplarily implementation, the $n^{th}$ node device transmits the $n^{th}$ fusion learning rate operator to the first node device, and after receiving the $n^{th}$ fusion learning rate operator, the first node device restores and obtains an accumulation result of the first learning rate operator to the $n^{th}$ learning rate operator based on the $n^{th}$ fusion learning rate operator and the random number, and calculates the learning rate based on the accumulation result, thereby transmitting the learning rate obtained by calculation to node devices of the second node device to the $n^{th}$ node device. After receiving the learning rate, each node device updates the $i^{th}$ model parameter of the $i^{th}$ sub-model according to $$w_{t+1}^{(i)} = w_t^{(i)} + \eta z_t^{(i)}.$$

in order to ensure convergence of the algorithm, it is also possible to take a very small positive number as the learning rate n, for example, η=0.01 is taken.

In the embodiment of this disclosure, firstly, sample alignment is performed by using the Freedman protocol, so as to obtain a training set which is significant for each sub-model, thereby improving the quality of the training set and the model training efficiency. On the basis of obtaining the second-order gradient descent direction by calculation, combined calculation is performed again to generate a learning rate for the current round of iterative training, so that the model parameter is updated based on the $i^{th}$ second-order gradient descent direction and the learning rate, which can further improve the model training efficiency and speed up the model training process.

The federated learning system iteratively trains each sub-model through the above-mentioned model training method, and finally obtains an optimized machine learning model, and the machine learning model is composed of n sub-models and can be used for model performance test or model applications. In the model application phase, the $i^{th}$ node device inputs data into the trained $i^{th}$ sub-model, and performs joint calculation in combination with other n−1 node devices to obtain model output. For example, when applied to an intelligent retail business, the data features involved mainly include user's purchasing power, user's personal preference and product features. In practical applications, these three data features may be dispersed in three different departments or different enterprises, for example, the user's purchasing power may be inferred from bank deposits, the personal preference may be analyzed from a social network, and the product features may be recorded by an electronic storefront. In this case, a federated learning model may be constructed and trained by combining three platforms of a bank, the social network and the electronic storefront to obtain an optimized machine learning model. Thus, in the case where the electronic storefront does not acquire user's personal preference information and bank deposit information, the electronic storefront combines with node devices corresponding to the bank and the social network to recommend an appropriate commodity to the user (namely, the node device of the bank party inputs the user deposit information into a local sub-model, the node device of the social network party inputs the user's personal preference information into the local sub-model, and the three parties perform cooperative calculation of federated learning to enable a node device of the electronic storefront party to output commodity recommendation information), which can fully protect data privacy and data security, and can also provide personalized and targeted services for the customer.

Figure 7:
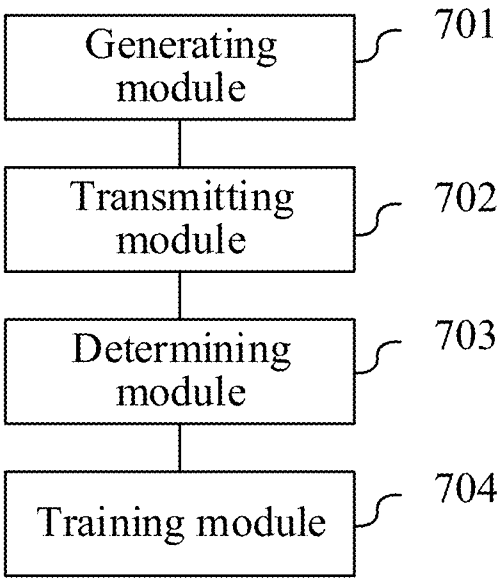
FIG. 7 is a structural block diagram of a model training apparatus for federated learning provided by an exemplary embodiment of this disclosure.

FIG. 7 is a structural block diagram of a model training apparatus for federated training provided by an exemplary embodiment of this disclosure, and the apparatus includes a structure as follows.

- a generating module 701, configured to generate an $i^{th}$ scalar operator based on a $(t-1)^{th}$ round of training data and a $t^{th}$ round of training data, the $(t-1)^{th}$ round of training data including an $i^{th}$ model parameter and an $i^{th}$ first-order gradient of an $i^{th}$ sub-model after the $(t-1)^{th}$ round of training, the $t^{th}$ round of training data including the $i^{th}$ model parameter and the $i^{th}$ first-order gradient of the $i^{th}$ sub-model after the $t^{th}$ round of training, the $i^{th}$ scalar operator being used for determining a second-order gradient scalar, the second-order gradient scalar being used for determining a second-order gradient descent direction in an iterative model training process, and t being an integer greater than 1;
- a transmitting module 702, configured to transmit an $i^{th}$ fusion operator to a next node device based on the $i^{th}$ scalar operator, the $i^{th}$ fusion operator being obtained by fusing scalar operators from a first scalar operator to the $i^{th}$ scalar operator;
- a determining module 703, configured to determine an $i^{th}$ second-order gradient descent direction of the $i^{th}$ sub-model based on the acquired second-order gradient scalar, the $i^{th}$ model parameter and the $i^{th}$ first-order gradient, the second-order gradient scalar being determined and obtained by a first node device based on an $n^{th}$ fusion operator; and
- a training module 704, configured to update the $i^{th}$ sub-model based on the $i^{th}$ second-order gradient descent direction to obtain model parameters of the $i^{th}$ sub-model during a $(t+1)^{th}$ round of iterative training.

Exemplarily, the transmitting module 702 is further configured to:

- transmit the $i^{th}$ fusion operator to an $(i+1)^{th}$ node device based on the $i^{th}$ scalar operator when the $i^{th}$ node device is not an $n^{th}$ node device; and
- transmit the $n^{th}$ fusion operator to the first node device based on the $i^{th}$ scalar operator when the $i^{th}$ node device is the $n^{th}$ node device.

Exemplarily, when the node device is not the first device, the transmitting module 702 is further configured to:

- generate a random number;
- generate a first fusion operator based on the random number and a first scalar operator, the random integer being secret to other node devices; and
- transmit the first fusion operator to a second node device.

Exemplarily, the transmitting module 702 is further configured to:

- perform a rounding operation on the first scalar operator;
- determine a first operator to be fused based on the first scalar operator after the rounding operation and the random number; and
- perform a modulo operation on the first operator to be fused to obtain the first fusion operator.

Exemplarily, the apparatus further includes a structure as follows:

- a receiving module, configured to receive the $n^{th}$ fusion operator transmitted by the $n^{th}$ node device;
- a restoring module, configured to restore an accumulation result of the first scalar operator to the $n^{th}$ scalar operator based on the random number and the $n^{th}$ fusion operator; and
- the determining module 703 is further configured to determine the second-order gradient scalar based on the accumulation result.

Exemplarily, when the node device is not the first node device, and the receiving module is further configured to receive an $(i-1)^{th}$ fusion operator transmitted by an $(i-1)^{th}$ node device.

The transmitting module 702 is further configured to:

- perform a rounding operation on the $i^{th}$ scalar operator;
- determine an $i^{th}$ operator to be fused based on the $i^{th}$ scalar operator after the rounding operation and the $(i-1)^{th}$ fusion operator;
- perform a modulo operation on the $i^{th}$ operator to be fused to obtain the $i^{th}$ fusion operator; and
- transmit the $i^{th}$ fusion operator to the $(i+1)^{th}$ node device.

Exemplarily, when the node device is the $n^{th}$ node device, the receiving module is further configured to:

- receive an $(n-1)^{th}$ fusion operator transmitted by an $(n-1)^{th}$ node device.

The transmitting module 702 is further configured to:

- perform a rounding operation on an $n^{th}$ scalar operator;
- determine an $n^{th}$ operator to be fused based on the $n^{th}$ scalar operator after the rounding operation and the $(n-1)^{th}$ fusion operator;
- perform a modulo operation on the $n^{th}$ operator to be fused to obtain the $n^{th}$ fusion operator; and
- transmit the $n^{th}$ fusion operator to the first node device.

Exemplarily, the generation module 701 is further configured to:

- generate an $i^{th}$ model parameter difference of the $i^{th}$ sub-model based on the $i^{th}$ model parameter in the $(t-1)^{th}$ round of training data and the $i^{th}$ model parameter in the $t^{th}$ round of training data;
- generate an $i^{th}$ first-order gradient difference of the $i^{th}$ sub-model based on the $i^{th}$ first-order gradient in the $(t-1)^{th}$ round of training data and the $i^{th}$ first-order gradient in the $t^{th}$ round of training data; and
- generate the $i^{th}$ scalar operator based on the $i^{th}$ first-order gradient in the $t^{th}$ round of training data, the $i^{th}$ first-order gradient difference and the $i^{th}$ model parameter difference.

Exemplarily, the generation module 701 is further configured to:

generate an $i^{th}$ learning rate operator based on an $i^{th}$ first-order gradient and an $i^{th}$ second-order gradient of the $i^{th}$ sub-model, the $i^{th}$ learning rate operator being used for determining a learning rate in response to performing model training based on the $i^{th}$ second-order gradient descent direction.

The transmitting module 702 is further configured to:

transmit an $i^{th}$ fusion learning rate operator to a next node device based on the $i^{th}$ learning rate operator, the $i^{th}$ fusion learning rate operator being obtained by fusing learning rate operators from a first learning rate operator to the $i^{th}$ learning rate operator.

The training module 704 is further configured to:

update the $i^{th}$ model parameter of the $i^{th}$ sub-model based on the $i^{th}$ second-order gradient descent direction and the acquired learning rate.

Exemplarily, when the node device is not the first device, the transmitting module 702 is further configured to:

generate a random number;

perform a rounding operation on a first learning rate operator;

determine a first learning rate operator to be fused based on the first learning rate operator after the rounding operation and the random number;

perform a modulo operation on the first learning rate operator to be fused to obtain a first fusion learning rate operator; and transmit the first fusion learning rate operator to a second node device.

Exemplarily, when the node device is not the first node device, the receiving module is further configured to:

receive an $(i-1)^{th}$ fusion learning rate operator transmitted by an $(i-1)^{th}$ node device.

The transmitting module 702 is further configured to:

perform a rounding operation on the $i^{th}$ learning rate operator;

determine an $i^{th}$ learning rate operator to be fused based on the $i^{th}$ learning rate operator after the rounding operation and the $(i-1)^{th}$ fused learning rate operator;

perform a modulo operation on the $i^{th}$ learning rate operator to be fused to obtain the $i^{th}$ fused learning rate operator; and transmit the $i^{th}$ fusion learning rate operator to the $(i+1)^{th}$ node device.

Exemplarily, the generation module 701 is further configured to:

perform sample alignment, based on the Freedman protocol or the blind signature Blind RSA protocol, in combination with other node devices to obtain an $i^{th}$ training set, sample objects corresponding to training sets from a first training set to an $n^{th}$ training set being consistent;

input sample data in the $i^{th}$ training set into the $i^{th}$ sub-model to obtain $i^{th}$ model output data; and obtain the $i^{th}$ first-order gradient, in combination with other node devices, based on the $i^{th}$ model output data.

In the embodiment of this disclosure, the second-order gradient of each sub-model is jointly calculated by transferring the fusion operators among the n node devices in the federated learning system to complete iterative model training, and a second-order gradient descent method can be used for training a machine learning model without relying on a third-party node; compared with a method using a trusted third party to perform model training in the related art, the problem of high single-point centralized security risk caused by single-point storage of a private key can be avoided, the security of federated learning is enhanced, and implementation of practical applications is facilitated.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory.

Each module can be implemented using one or more processors (or processors and memory). Likewise, a processor (or processors and memory) can be used to implement one or more modules. Moreover, each module can be part of an overall module that includes the functionalities of the module.

Figure 8:
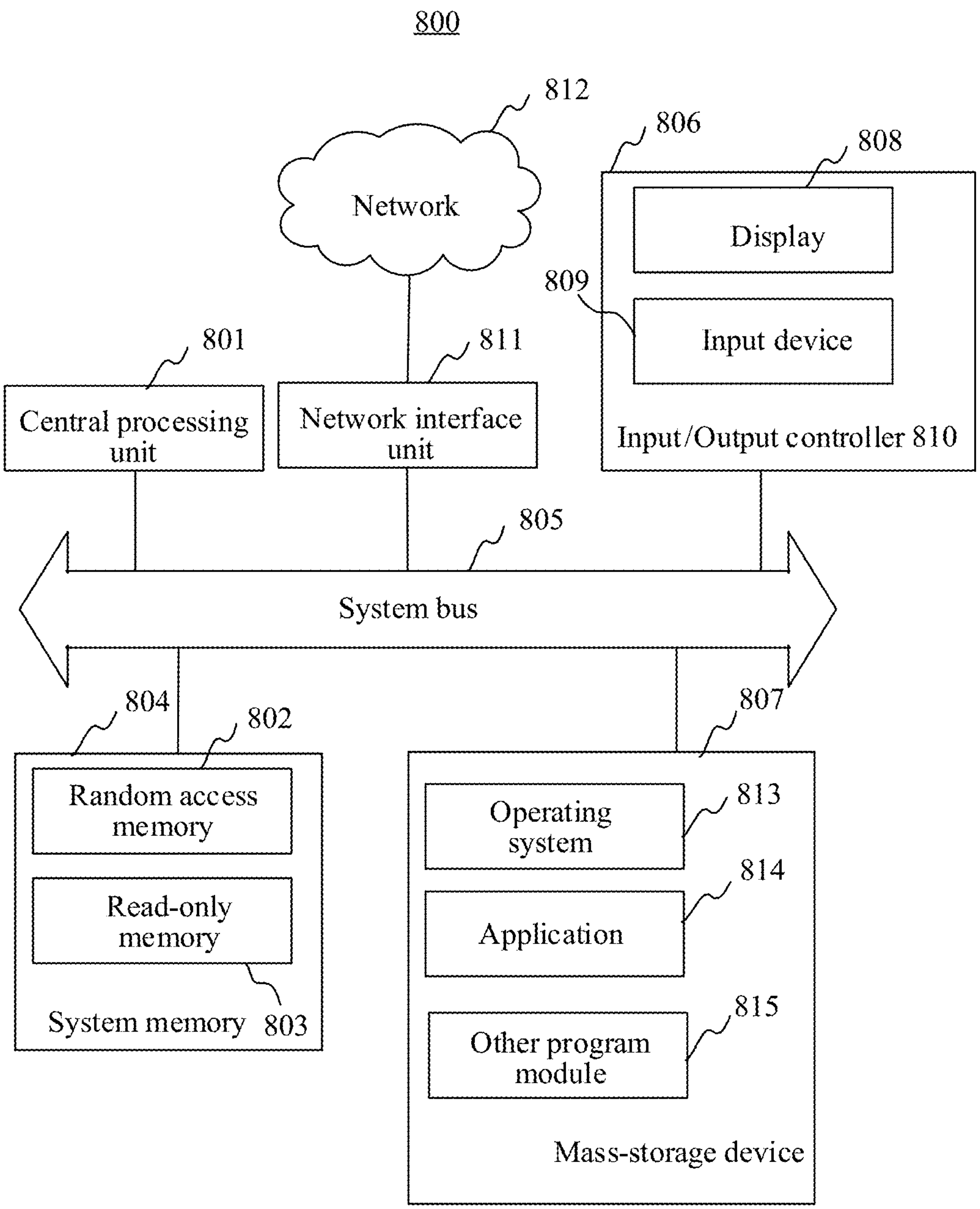
FIG. 8 is a structural block diagram of a computer device provided by an exemplary embodiment of this disclosure.

Referring to FIG. 8, which shows a schematic structural diagram of a computer device provided by an embodiment of this disclosure.

The computer device 800 includes a central processing unit (CPU) 801, a system memory 804 including a random access memory (RAM) 802 and a read memory (ROM) 803, and a system bus 805 connecting the system memory 804 to the CPU 801. The computer device 800 further includes a basic input/output (I/O) system 806 assisting in transmitting information between components in a computer, and a mass storage device 807 configured to store an operating system 813, an application program 814, and another program module 815.

The basic input/output system 806 includes a display 808 configured to display information and an input device 809 such as a mouse and a keyboard for a user to input information. The display 808 and the input device 809 are both connected to the central processing unit 801 through an input/output controller 810 connected to the system bus 805. The basic input/output system 806 may further include the input/output controller 810 for receiving and processing input from a plurality of other devices such as a keyboard, a mouse, an electronic stylus, or the like. Similarly, the I/O controller 810 further provides an output to a display screen, a printer, or another type of output device.

The mass storage device 807 is connected to the central processing unit 801 through a mass storage controller (not shown) connected to the system bus 805. The mass storage device 807 and an associated computer-readable medium provide non-volatile storage for the computer device 800. That is, the mass storage device 807 may include a computer-readable medium (not shown) such as a hard disk or a compact disc ROM (CD-ROM) drive.

In general, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), a flash memory or another solid-state storage technology, a CD-ROM, a digital versatile disc (DVD) or another optical storage, a magnetic cassette, a magnetic tape, or a magnetic disk storage or another magnetic storage device. Certainly, those skilled in the art may learn that the computer storage medium is not limited to the above. The foregoing system memory 804 and mass storage device 807 may be collectively referred to as a memory.

According to the embodiments of this disclosure, the computer device 800 may further be connected, through a network such as the Internet, to a remote computer on the network and run. That is, the computer device 800 may be connected to a network 812 by using a network interface unit 811 connected to the system bus 805, or may be connected to another type of network or a remote computer system (not shown) by using a network interface unit 811.

The memory further includes at least one instruction, at least one program, a code set, or an instruction set. The at least one instruction, the at least one program, the code set, or the instruction set is stored in the memory and is configured to be executed by one or more processors to implement the foregoing model training method for federated learning.

An embodiment of this disclosure further provides a computer-readable storage medium, storing at least one instruction, the at least one instruction being loaded and executed by a processor to implement the model training method for federated learning described in the foregoing embodiments.

An aspect of the embodiments of this disclosure provides a computer program product or a computer program, the computer program product or the computer program including computer instructions, the computer instructions being stored in a computer-readable storage medium. A processor of a computer device reads the computer instructions from the computer-readable storage medium, and the processor executes the computer instructions, so that the computer device performs the model training method for federated learning provided in the various optional implementations in the foregoing aspects.

It is to be understood that, the information (including but not limited to user equipment information, user's personal information, etc.), data (including but not limited to data used for analysis, stored data, displayed data, etc.) and signals involved in this disclosure are authorized by the user or fully authorized by all parties, and the collection, use and processing of relevant data is to comply with relevant laws, regulations and standards of relevant countries and regions. For example, the data employed by the various node devices in the model training and model reasoning phases of this disclosure is acquired in a case of sufficient authorization.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. A model training method for federated learning, performed by an $i^{th}$ node device in a vertical federated learning system, comprising n node devices, n being an integer greater than or equal to 2, i being a positive integer less than or equal to n, the method comprising:

generating an $i^{th}$ scalar operator based on a $(t-1)^{th}$ round of training data and a $t^{th}$ round of training data, the $(t-1)^{th}$ round of training data comprising an $i^{th}$ model parameter and an $i^{th}$ first-order gradient of an $i^{th}$ sub-model after the $(t-1)^{th}$ round of training, the $t^{th}$ round of training data comprising the $i^{th}$ model parameter and the $i^{th}$ first-order gradient of the $i^{th}$ sub-model after the $t^{th}$ round of training, t being an integer greater than 1;

generating, when the $i^{th}$ node device is a first node device, a first sum operator by:

generating a first scalar operator and performing a round operation on the first scalar operation;

generating a random number; and generating the first sum operator based on at least the random number and the first scalar operator, the random number being secret to other node devices; and transmitting the first sum operator to a next node device;

generating, when the $i^{th}$ node device is not the first node device, an $i^{th}$ sum operator by:

receiving an $(i-1)^{th}$ sum operator transmitted by an $(i-1)^{th}$ node device;

performing a rounding operation on the $i^{th}$ scalar operator;

determining an $i^{th}$ intermediate sum operator based on at least the $i^{th}$ scalar operator after the rounding operation and the $(i-1)^{th}$ sum operator;

performing a modulo operation on the $i^{th}$ intermediate sum operator to obtain the $i^{th}$ sum operator;

transmitting the $i^{th}$ sum operator to the next node device;

determining an $i^{th}$ second-order gradient descent direction of the $i^{th}$ sub-model based on a second-order gradient scalar, the $i^{th}$ model parameter, and the $i^{th}$ first-order gradient, the second-order gradient scalar being obtained by the first node device based on an $n^{th}$ sum operator; and updating the $i^{th}$ sub-model based on the $i^{th}$ second-order gradient descent direction to obtain model parameters of the $i^{th}$ sub-model during a $(t+1)^{th}$ round of iterative training, wherein before determining the $i^{th}$ second-order gradient descent direction of the $i^{th}$ sub-model at the first node device, the method further comprises:

receiving the $n^{th}$ sum operator transmitted by an $n^{th}$ node device;

restoring an accumulation result of the first scalar operator to an $n^{th}$ scalar operator based on the random number and the $n^{th}$ sum operator; and determining the second-order gradient scalar based on the accumulation result.

2. The method according to claim 1, wherein transmitting the $i^{th}$ sum operator to the next node device comprises:

transmitting the $i^{th}$ sum operator to an $(i+1)^{th}$ node device when the $i^{th}$ node device is not an $n^{th}$ node device; and transmitting the $n^{th}$ sum operator to the first node device when the $i^{th}$ node device is the $n^{th}$ node device.

3. The method according to claim 1, wherein generating the first sum operator based on at least the random number and the first scalar operator comprises:

performing a rounding operation on the first scalar operator;

determining a first intermediate sum operator based on the first scalar operator after the rounding operation and the random number; and performing a modulo operation on the first intermediate sum operator to obtain the first sum operator.

4. The method according to claim 1, wherein generating the $i^{th}$ scalar operator based on the $(t-1)^{th}$ round of training data and the $t^{th}$ round of training data comprises:

generating an $i^{th}$ model parameter difference of the $i^{th}$ sub-model based on the $i^{th}$ model parameter in the $(t-1)^{th}$ round of training data and the $i^{th}$ model parameter in the $t^{th}$ round of training data;

generating an $i^{th}$ first-order gradient difference of the $i^{th}$ sub-model based on the $i^{th}$ first-order gradient in the $(t-1)^{th}$ round of training data and the $i^{th}$ first-order gradient in the $t^{th}$ round of training data; and generating the $i^{th}$ scalar operator based on the $i^{th}$ first-order gradient in the $t^{th}$ round of training data, the $i^{th}$ first-order gradient difference and the $i^{th}$ model parameter difference.

5. A model training method for federated learning, performed by an $i^{th}$ node device in a vertical federated learning system, comprising n node devices, n being an integer greater than or equal to 2, i being a positive integer less than or equal to n, the method comprising:

determining an $i^{th}$ second-order gradient descent direction of an $i^{th}$ sub-model:

generating an $i^{th}$ learning rate operator based on an $i^{th}$ first-order gradient and an $i^{th}$ second-order gradient of the $i^{th}$ sub-model, the $i^{th}$ learning rate operator being used for determining a learning rate in response to performing model training based on the $i^{th}$ second-order gradient descent direction;

generating, when the $i^{th}$ node device is a first node device, a first sum learning rate operator by:

generating a random number;

generating a first learning rate operator and performing a rounding operation on the first learning rate operator;

determining a first intermediate sum learning rate operator based on at least the first learning rate operator after the rounding operation and the random number; and performing a modulo operation on the first intermediate sum learning rate operator to obtain the first sum learning rate operator; and transmitting the first sum learning rate operator to a next node device;

generating, when the $i^{th}$ node device is not the first node device, an $i^{th}$ sum learning rate operator by:

receiving an $(i-1)^{th}$ sum learning rate operator transmitted by an $(i-1)^{th}$ node device;

performing a rounding operation on the $i^{th}$ learning rate operator;

determining an $i^{th}$ intermediate sum learning rate operator based on at least the $i^{th}$ learning rate operator after the rounding operation and the $(i-1)^{th}$ sum learning rate operator; and performing a modulo operation on the $i^{th}$ intermediate sum learning rate operator to obtain the $i^{th}$ sum learning rate operator; and transmitting the $i^{th}$ sum learning rate operator to the next node device, wherein updating the $i^{th}$ sub-model based on the $i^{th}$ second-order gradient descent direction comprising:

updating an $i^{th}$ model parameter of the $i^{th}$ sub-model based on the $i^{th}$ second-order gradient descent direction and the learning rate, wherein before determining the $i^{th}$ second-order gradient descent direction of the $i^{th}$ sub-model at the first node device, the method further comprises:

receiving an $n^{th}$ sum operator transmitted by an $n^{th}$ node device;

restoring an accumulation result of a first scalar operator to an $n^{th}$ scalar operator based on the random number and the $n^{th}$ sum operator; and determining a second-order gradient scalar based on the accumulation result.

6. The method according to claim 1, wherein before generating the $i^{th}$ scalar operator based on the $(t-1)^{th}$ round of training data and the $t^{th}$ round of training data, the method further comprises:

performing sample alignment, based on a Freedman protocol or a blind signature Blind RSA protocol and in combination with other node devices, to obtain an $i^{th}$ training set, wherein sample objects corresponding to training sets from a first training set to an $n^{th}$ training set are consistent;

inputting sample data in the $i^{th}$ training set into the $i^{th}$ sub-model to obtain $i^{th}$ model output data; and obtaining the $i^{th}$ first-order gradient, in combination with other node devices, based on the $i^{th}$ model output data.

7. A computer device, comprising:

a memory, configured to store at least one program; and at least one processor, electrically coupled to the memory and configured to execute the at least one program to perform steps comprising:

generating, by an $i^{th}$ node device in a vertical federated learning system having n node devices, an $i^{th}$ scalar operator based on a $(t-1)^{th}$ round of training data and a $t^{th}$ round of training data, the $(t-1)^{th}$ round of training data comprising an $i^{th}$ model parameter and an $i^{th}$ first-order gradient of an $i^{th}$ sub-model after the $(t-1)^{th}$ round of training, the $t^{th}$ round of training data comprising the $i^{th}$ model parameter and the $i^{th}$ first-order gradient of the $i^{th}$ sub-model after the $t^{th}$ round of training, t being an integer greater than 1, n being an integer greater than or equal to 2, and i being a positive integer less than or equal to n;

generating, when the $i^{th}$ node device is a first node device, a first sum operator by:

generating a first scalar operator and performing a round operation on the first scalar operation;

generating a random number; and generating the first sum operator based on at least the random number and a first scalar operator, the random number being secret to other node devices; and transmitting the first sum operator to a next node device;

generating, when the $i^{th}$ node device is not the first node device, an $i^{th}$ sum operator by:

receiving an $(i-1)^{th}$ sum operator transmitted by an $(i-1)^{th}$ node device;

performing a rounding operation on the $i^{th}$ scalar operator;

determining an $i^{th}$ intermediate sum operator based on at least the $i^{th}$ scalar operator after the rounding operation and the $(i-1)^{th}$ sum operator;

performing a modulo operation on the $i^{th}$ intermediate sum operator to obtain the $i^{th}$ sum operator;

transmitting the $i^{th}$ sum operator to the next node device;

determining an $i^{th}$ second-order gradient descent direction of the $i^{th}$ sub-model based on a second-order gradient scalar, the $i^{th}$ model parameter, and the $i^{th}$ first-order gradient, the second-order gradient scalar being obtained by the first node device based on an $n^{th}$ sum operator; and updating the $i^{th}$ sub-model based on the $i^{th}$ second-order gradient descent direction to obtain model parameters of the $i^{th}$ sub-model during a $(t+1)^{th}$ round of iterative training, wherein before determining the $i^{th}$ second-order gradient descent direction of the $i^{th}$ sub-model at the first node device, the at least one processor is further configured to perform:

receiving the $n^{th}$ sum operator transmitted by an $n^{th}$ node device;

restoring an accumulation result of the first scalar operator to an $n^{th}$ scalar operator based on the random number and the $n^{th}$ sum operator; and determining the second-order gradient scalar based on the accumulation result.

8. The computer device of claim 7, wherein the at least one processor is configured to execute the at least one program to transmit the $i^{th}$ sum operator to the next node device by:

transmitting the $i^{th}$ sum operator to an $(i+1)^{th}$ node device when the $i^{th}$ node device is not an $n^{th}$ node device; and transmitting the $n^{th}$ sum operator to the first node device when the $i^{th}$ node device is the $n^{th}$ node device.

9. The computer device of claim 7, wherein the at least one processor is configured to execute the at least one program to generate the $i^{th}$ scalar operator based on the $(t-1)^{th}$ round of training data and the $t^{th}$ round of training data by:

generating an $i^{th}$ model parameter difference of the $i^{th}$ sub-model based on the $i^{th}$ model parameter in the $(t-1)^{th}$ round of training data and the $i^{th}$ model parameter in the $t^{th}$ round of training data;

generating an $i^{th}$ first-order gradient difference of the $i^{th}$ sub-model based on the $i^{th}$ first-order gradient in the $(t-1)^{th}$ round of training data and the $i^{th}$ first-order gradient in the $t^{th}$ round of training data; and generating the $i^{th}$ scalar operator based on the $i^{th}$ first-order gradient in the $t^{th}$ round of training data, the $i^{th}$ first-order gradient difference and the $i^{th}$ model parameter difference.

10. The computer device of claim 7, wherein the at least one processor is further configured execute the at least one program to perform steps comprising:

generating an $i^{th}$ learning rate operator based on an $i^{th}$ first-order gradient and an $i^{th}$ second-order gradient of the $i^{th}$ sub-model, the $i^{th}$ learning rate operator being used for determining a learning rate in response to performing model training based on the $i^{th}$ second-order gradient descent direction;

performing a rounding operation on the $i^{th}$ learning rate operator;

determining an $i^{th}$ intermediate sum learning rate operator based on at least the $i^{th}$ learning rate operator after the rounding operation;

performing a modulo operation on the $i^{th}$ intermediate sum learning rate operator to obtain an $i^{th}$ sum learning rate operator; and transmitting the $i^{th}$ sum learning rate operator to a next node device, wherein the at least one processor is configured to update the $i^{th}$ sub-model based on the $i^{th}$ second-order gradient descent direction by:

updating the $i^{th}$ model parameter of the $i^{th}$ sub-model based on the $i^{th}$ second-order gradient descent direction and the learning rate.

* * * * *